(12) United States Patent
Nejatali et al.

(10) Patent No.: US 9,812,875 B2
(45) Date of Patent: Nov. 7, 2017

(54) SYSTEMS AND METHODS FOR ADJUSTING MAGNETIC FIELD DISTRIBUTION USING FERROMAGNETIC MATERIAL

(71) Applicant: QUALCOMM Incorporated, San Diego, CA (US)

(72) Inventors: Saeed Nejatali, San Diego, CA (US); Francesco Carobolante, Carlsbad, CA (US); Ryan Tseng, Coronado, CA (US); Mei-Li Chi, San Diego, CA (US); Seong Heon Jeong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 725 days.

(21) Appl. No.: 14/478,461

(22) Filed: Sep. 5, 2014

(65) Prior Publication Data

US 2016/0072296 A1    Mar. 10, 2016

(51) Int. Cl.
*H02J 5/00* (2016.01)
*H02J 7/02* (2016.01)
*H02J 7/00* (2006.01)
*H01F 38/14* (2006.01)
*H02J 50/12* (2016.01)

(52) U.S. Cl.
CPC ........... *H02J 5/005* (2013.01); *H01F 38/14* (2013.01); *H02J 7/0044* (2013.01); *H02J 7/025* (2013.01); *H02J 50/12* (2016.02)

(58) Field of Classification Search
CPC ......... H02J 7/0044; H02J 50/12; H01F 50/12; H04B 5/0037
See application file for complete search history.

(56) References Cited

U.S. PATENT DOCUMENTS

| 5,821,638 A | 10/1998 | Boys et al. |
| 7,211,986 B1 | 5/2007 | Flowerdew et al. |
| 8,324,759 B2 | 12/2012 | Karalis et al. |

(Continued)

FOREIGN PATENT DOCUMENTS

| WO | WO-2012102567 A2 | 8/2012 |
| WO | WO-2013036146 A1 | 3/2013 |

OTHER PUBLICATIONS

International Search Report and Written Opinion—PCT/US2015/047512—ISA/EPO—dated Nov. 12, 2015.

*Primary Examiner* — Robert Deberadinis
(74) *Attorney, Agent, or Firm* — Knobbe, Martens, Olson & Bear, LLP

(57) ABSTRACT

A uniform magnetic field may provide better performance in wireless power transmitters due to smaller impedance variations in an output of a power amplifier of a wireless power transmitter and also allow for wireless power transmitter pads to be thinner. One aspect of the disclosure provides a device for wireless power transfer. The device comprises a substantially planar transmit antenna that is configured to generate a magnetic field. The device also comprises a pad having a charging surface. At least a portion of the transmit antenna is disposed in the pad. The device also comprises a ferromagnetic material having a shape and a position relative to the transmit antenna. At least one of the shape or position of the ferromagnetic material, or a combination thereof, is selected to modify a distribution of the magnetic field at the charging surface.

30 Claims, 15 Drawing Sheets

(56) References Cited

U.S. PATENT DOCUMENTS

2012/0086394 A1 4/2012 Hui
2014/0015480 A1* 1/2014 Cheikh ................ H04B 5/0037
                                                         320/108
2014/0060505 A1 3/2014 Khan et al.

* cited by examiner

SYSTEMS AND METHODS FOR ADJUSTING MAGNETIC FIELD DISTRIBUTION USING FERROMAGNETIC MATERIAL

FIELD

The present invention relates generally to wireless power. More specifically, the disclosure is directed to adjusting a distribution of a magnetic field generated by a wireless power transmitter using ferromagnetic material.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. A uniform magnetic field may provide better performance in wireless power transmitters due to smaller impedance variations in an output of a power amplifier of a wireless power transmitter. As such, systems and methods for adjusting magnetic field distribution to improve field uniformity are desirable in wireless power transfer systems.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a device for wireless power transfer. The device comprises a substantially planar transmit antenna that is configured to generate a magnetic field. The device also comprises a pad having a charging surface. At least a portion of the transmit antenna is disposed in the pad. The device also comprises a ferromagnetic material having a shape and a position relative to the transmit antenna. At least one of the shape or position of the ferromagnetic material, or a combination thereof, is selected to modify a distribution of the magnetic field at the charging surface.

Another aspect of the disclosure provides a method for wireless power transfer. The method comprises generating a magnetic field at a substantially planar transmit antenna, at least a portion of the transmit antenna disposed in a pad. The method also comprises modifying a distribution of the magnetic field at a charging surface of a pad using ferromagnetic material, the ferromagnetic material having a shape and positioned relative to the transmit antenna.

Another aspect of the disclosure provides a device for wireless power transfer. The device comprises means for generating a magnetic field. The device also comprises means for modifying a distribution of the magnetic field at a charging surface of a pad, the modifying means having a shape and positioned relative to the generating means.

Another aspect of the disclosure provides an apparatus for wirelessly transferring charging power to one or more receiver devices. The apparatus comprises a coil configured to generate a magnetic field for wirelessly transferring the charging power to the one or more receiver devices, the coil having a shape defining a first plane. The apparatus also comprises a housing configured to house the coil, the housing having a surface configured to allow positioning the one or more receiver devices thereon, the surface defining a second plane substantially parallel to the first plane of the coil. The apparatus also comprises a ferromagnetic material positioned between the coil and the surface.

Another aspect of the disclosure provides a method for wirelessly transferring charging power to one or more receiver devices. The method comprises generating a magnetic field at a coil for wirelessly transferring the charging power to the one or more receiver devices, the coil being housed in a housing having a surface. The method also comprises selecting and positioning ferromagnetic material to increase a uniformity of the magnetic field across the surface where the one or more receiver devices receive power via the magnetic field.

Another aspect of the disclosure provides an apparatus for wirelessly transferring charging power to one or more receiver devices. The apparatus comprises means for generating a magnetic field for wirelessly transferring the charging power to the one or more receiver devices, magnetic field generating means being housed in a housing having a surface. The apparatus also comprises ferromagnetic material selected and positioned to increase a uniformity of the magnetic field across the surface where the one or more receiver devices receive power via the magnetic field.

Figure 1:
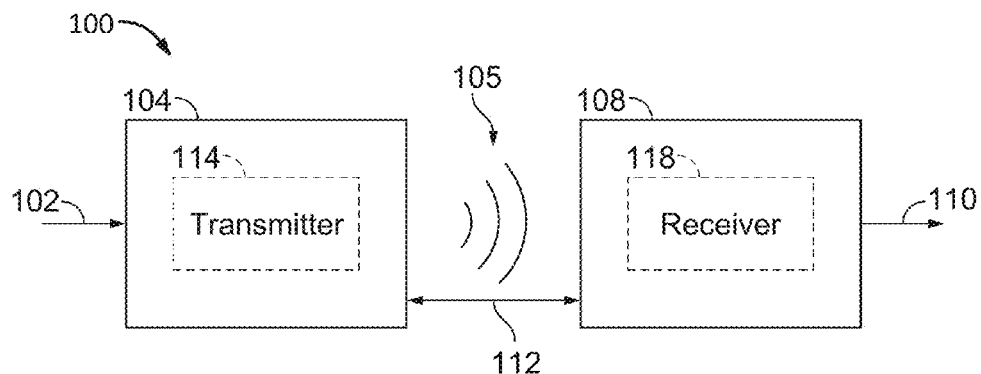
FIG. 1 is a functional block diagram of an exemplary wireless power transfer system.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances in contrast to purely inductive solutions that may require large coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by the receiver 108. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in the field 105 of the transmit antenna 114 to the receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
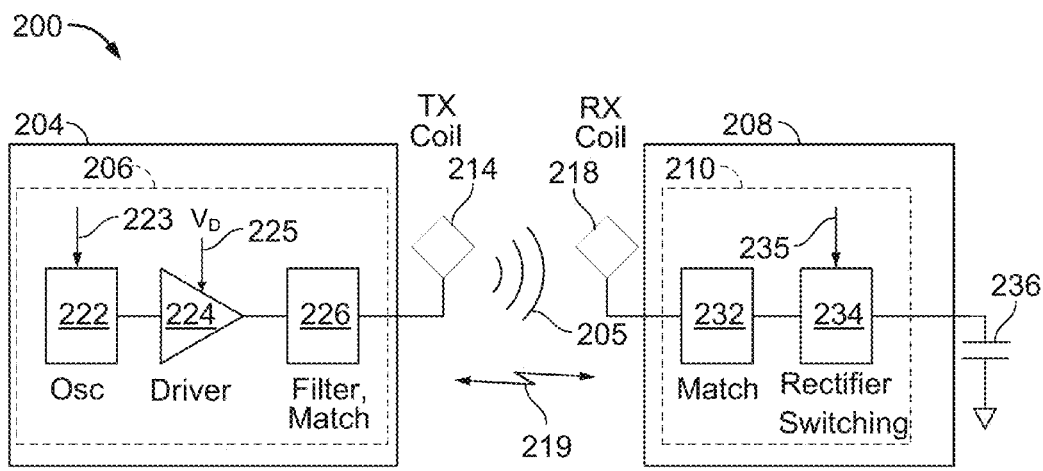
FIG. 2 is a functional block diagram of exemplary components that may be used in the wireless power transfer system of FIG. 1.

FIG. 2 is a functional block diagram 200 of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to the driver circuit 224 configured to drive the transmit antenna 214 at, for example, a resonant frequency of the transmit antenna 214. The driver circuit 224 may be a switching amplifier configured to receive a voltage $V_D$ 225 and a square wave from the oscillator 222 and output a sine wave. For example, the driver circuit 224 may be a class E amplifier. The filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or powering an electronic device. As one example, the power provided may be for example on the order of 300 milliWatts to 5 Watts to power or charge different devices with different power requirements. Higher or lower power levels may also be provided.

The receiver 208 may include receive circuitry 210 that may include a matching circuit 232 and a rectifier and switching circuit 234 to generate a direct current (DC) power output from an alternative current (AC) power input to charge a battery 236 as shown in FIG. 2 or to power a device (not shown) coupled to the receiver 208. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 205.

As described more fully below, receiver 208, that may initially have a selectively disableable associated load (e.g., a battery 236), may be configured to determine whether an amount of power transmitted by transmitter 204 and received by receiver 208 is appropriate for charging the battery 236. Further, receiver 208 may be configured to enable a load (e.g., battery 236) upon determining that the amount of power is appropriate. In some embodiments, the receiver 208 may be configured to directly utilize power received from a wireless power transfer field without charging of the battery 236. For example, a communication device, such as a near-field communication (NFC) or radio-frequency identification device (RFID) may be configured to receive power from a wireless power transfer field and communicate by interacting with the wireless power transfer field and/or utilize the received power to communicate with the transmitter 204 or other devices.

Figure 3:
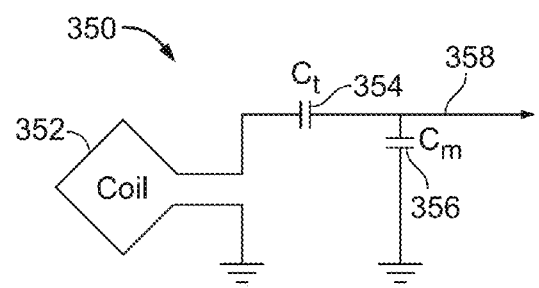
FIG. 3 is a schematic diagram of a portion of transmit circuitry or receive circuitry of FIG. 2 including a transmit or receive antenna.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna 352 may also be referred to as a coil of a type that is configured to wirelessly output or receive power. As used herein, the antenna 352 is an example of a "power transfer component" of a type that is configured to wirelessly output and/or receive power. The antenna 352 may be configured to include an air core or a physical core such as a ferrite core (not shown). Air core loop antennas may be more tolerant to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 205 of the transmit antenna 214 coil to the receive antenna 218 residing in the neighborhood where this field 205 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, capacitor 356 and capacitor 354 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 35 2. For transmit antennas, the signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver 108 is within the field 105, the time varying magnetic field may induce a current in the receive antenna 114. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
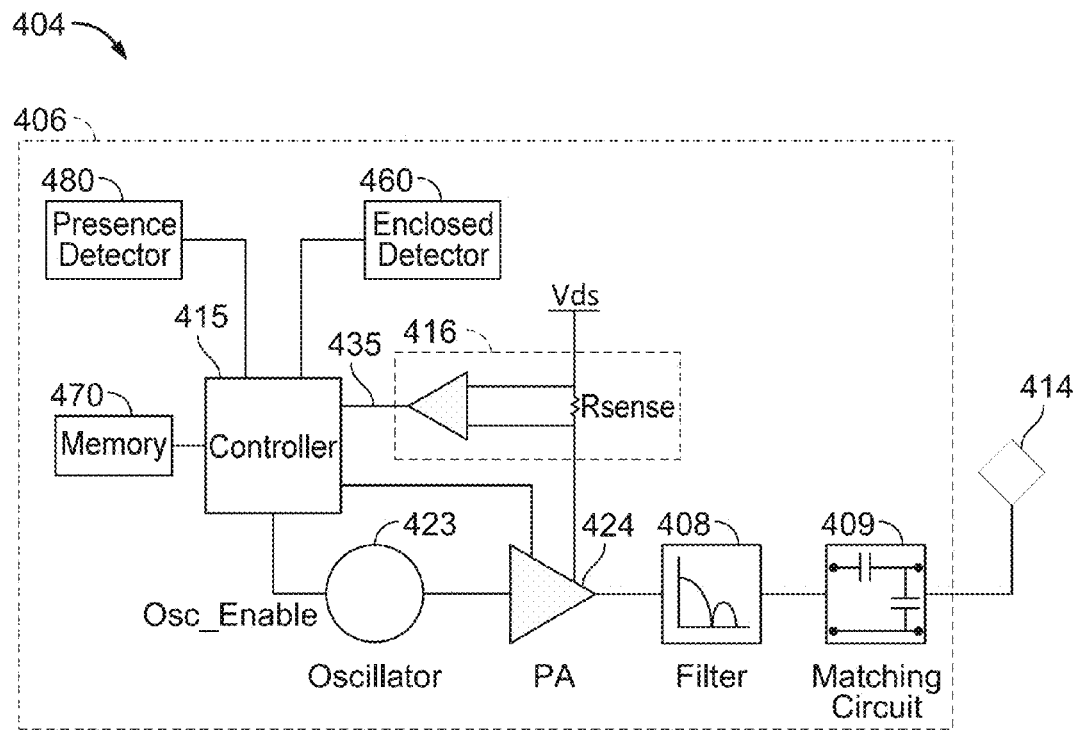
FIG. 4 is a functional block diagram of a transmitter that may be used in the wireless power transfer system of FIG. 1.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz industrial, scientific, and medical (ISM) band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to the receiver 108 (FIG. 1). Transmit circuitry 406 further includes a driver circuit 424 configured to receive a voltage Vds and drive a radio frequency (RF) signal as determined by an oscillator 423. Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as a processor. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of the transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
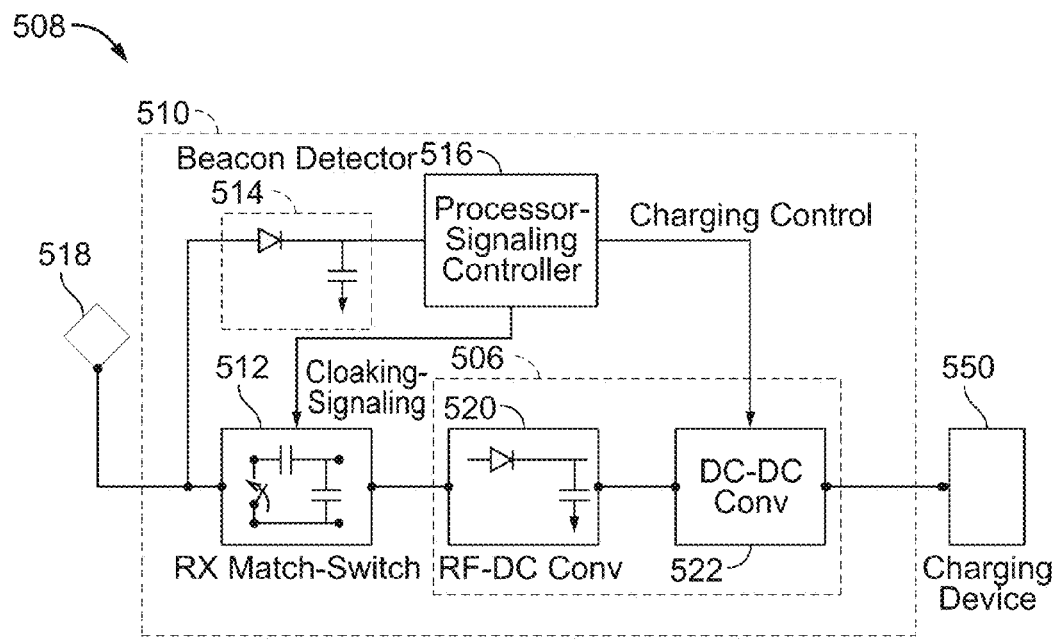
FIG. 5 is a functional block diagram of a receiver that may be used in the wireless power transfer system of FIG. 1.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (and other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller than the diameter or length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Certain wireless power transmitters use loosely coupled resonators (e.g., transmit antennas) for wireless power transfer, allowing for construction of large transmitter pads comprising large transmit antennas that are configured to charge multiple devices at the same time. A transmit antenna large enough to charge multiple devices may generate a magnetic field having a non-uniform strength over the area of the transmitter pad. The uniformity of the magnetic field may be measured based on the variance between the magnetic field strength (e.g., H-field) values over the area of the transmitter pad.

In wireless power transfer, a non-uniform magnetic field may be detrimental because it may provide different voltages to devices positioned at different areas of the transmitter pad. A wireless power receiver may be configured to operate within a limited voltage range. The differences in voltage may cause a device to be in over-voltage or under-voltage condition depending on its position on the pad. A uniform magnetic field may provide more consistency in voltage across the area of the wireless power transmitter. Furthermore mutual inductance between a wireless power transmitter and a wireless power receiver may be position dependent where the transmitter generates a non-uniform magnetic field. A uniform magnetic field is beneficial because it allows for less variation in mutual inductance when a wireless power receiver is positioned on a wireless power transmitter. As such, a uniform magnetic field may allow wireless power receivers to comply with various different wireless power transmitters. Also, a more uniform magnetic field may cause smaller impedance variations at a power amplifier output of the wireless power transmitter, thereby providing more efficient wireless power transfer.

Ferromagnetic materials (e.g., ferrite) may be used to affect the distribution of the magnetic field. For example, ferromagnetic materials may provide a conduit for the magnetic field. Ferromagnetic materials may also act as a shield, blocking the flow of magnetic flux or as a channel for guiding magnetic flux. Ferromagnetic materials with a higher magnetic permeability may be more effective in modifying the magnetic field distribution, providing a stronger degree of shielding or acting as a more effective conduit depending on the implementation. Ferromagnetic materials may also block a portion of the magnetic field from passing through the material based on a magnetic permeability of the material. As such, the shape, position, and magnetic permeability of ferromagnetic materials also may be used to modify the distribution of a magnetic field. For example, ferromagnetic material may be positioned near the transmit antenna in order to affect the magnetic field generated by the transmit antenna. As further described below, the shape, positioning, and magnetic permeability of ferromagnetic materials may be selected in order to achieve a more uniform distribution of a magnetic field over a charging surface of a wireless power transmitter pad. The ferromagnetic material may also improve the magnetic compatibility of the transmitter by reducing the effects of metallic objects near the transmitter on the transmit circuitry. The ferromagnetic material may also be configured to reduce the amount of magnetic flux that radiates away from the wireless power transmitted. In additional, the ferromagnetic material may also be configured to reduce the negative effects on other co-located wireless antenna systems cause by the magnetic field (e.g., improve desense).

Figure 6:
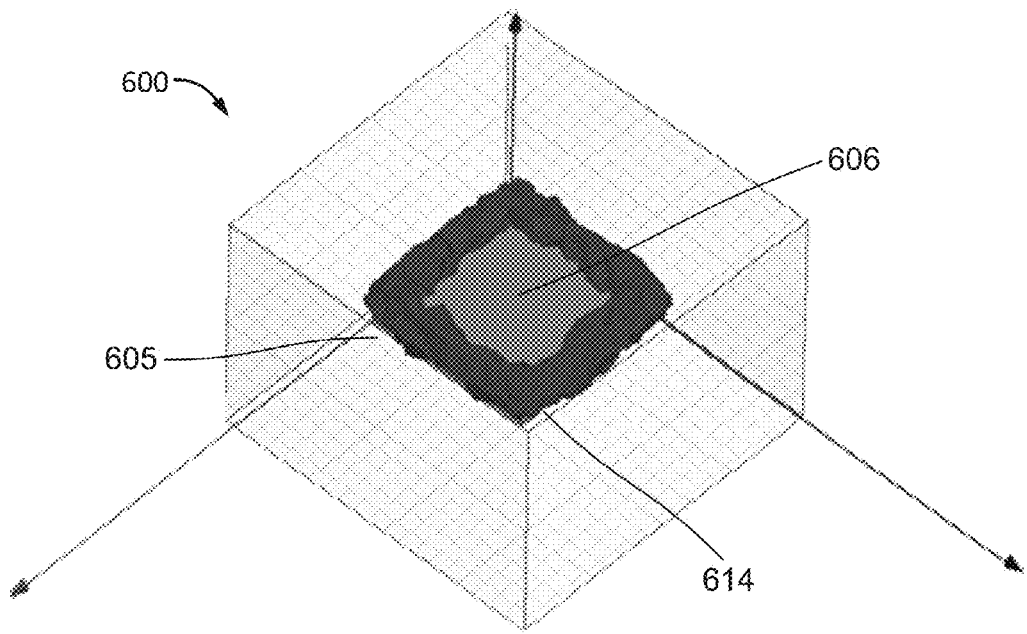
FIG. 6 shows a graph of a software simulated magnetic field generated by a transmit antenna.

FIG. 6 shows a graph 600 of a simulated magnetic field 605 generated by a transmit antenna 614. The graph 600 of the magnetic field 605 shows the shape, magnitude, and direction of the magnetic field intensity when ferromagnetic material is not present. The transmit antenna 614 may be a planar air-core loop antenna in a rectangular shape. The transmit antenna 614 may be a component of a wireless power transmitter 404 as described above with reference to FIG. 4. As shown in FIG. 6, the strength of the magnetic field 605 may be concentrated around the transmit antenna 614 and the magnetic field may be weaker in the center area 606 of the transmit antenna 614. As such, the magnetic field 605 may have a large variance between the maximum and minimum magnetic field strength values over the area of the transmitter. In general, a magnetic field having a large variance in field strength (e.g., field 605) may be referred to as a non-uniform magnetic field.

Figure 7:
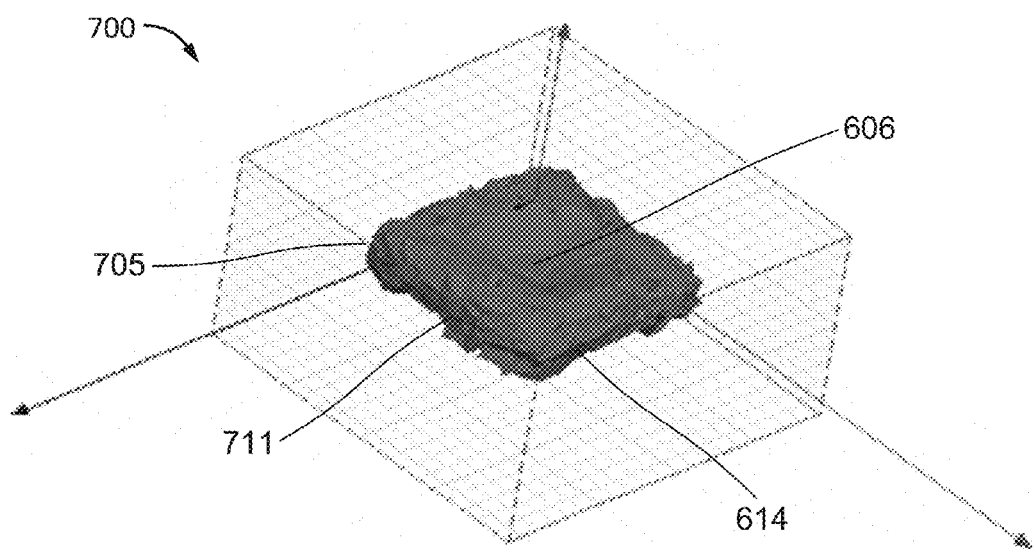
FIG. 7 is similar to FIG. 6 except ferromagnetic material is positioned below the transmit antenna to modify the magnetic field.

FIG. 7 shows a graph 700 of a simulated magnetic field 705 generated by the transmit antenna 614 of FIG. 6 with ferromagnetic material 711 positioned below the transmit antenna 614. The ferromagnetic material 711 may be positioned at a distance below the transmit antenna 614 that is 10% of a size of the transmit antenna 614. In other embodiments the ferromagnetic material 711 may be positioned at larger or smaller distances from the transmit antenna 614. The ferromagnetic material 711 may be shaped as a rectangular sheet. In other embodiments the ferromagnetic material may have a different shape as described in further detail below. The ferromagnetic material 711 may be configured to act as a conduit for the magnetic field 705 generated by the transmit antenna 614. As shown in FIG. 7, the magnetic field 705 may be less concentrated around the transmit antenna 614 and the magnetic field intensity may be stronger in the center area 606 of the transmit antenna 614 compared to the magnetic field 605 of FIG. 6. As the graph 700 shows, positioning ferromagnetic material 711 below the transmit antenna 614 may provide a more uniform magnetic field distribution (e.g., less variance between maximum and minimum field strength values). In addition, the ferromagnetic material 711 may make the transmit antenna 614 less sensitive to interference from nearby metal objects as described above. The ferromagnetic material 711 may also reduce the amount of magnetic flux being developed underneath the wireless power transmitter. The reduction in the amount of magnetic flux developed underneath the wireless power transmitter is beneficial because such magnetic flux may not be used to charge a wireless power receiver positioned on top of the wireless power transmitter and it may cause magnetic compatibility issues and unnecessary coupling as described above.

Figure 8:
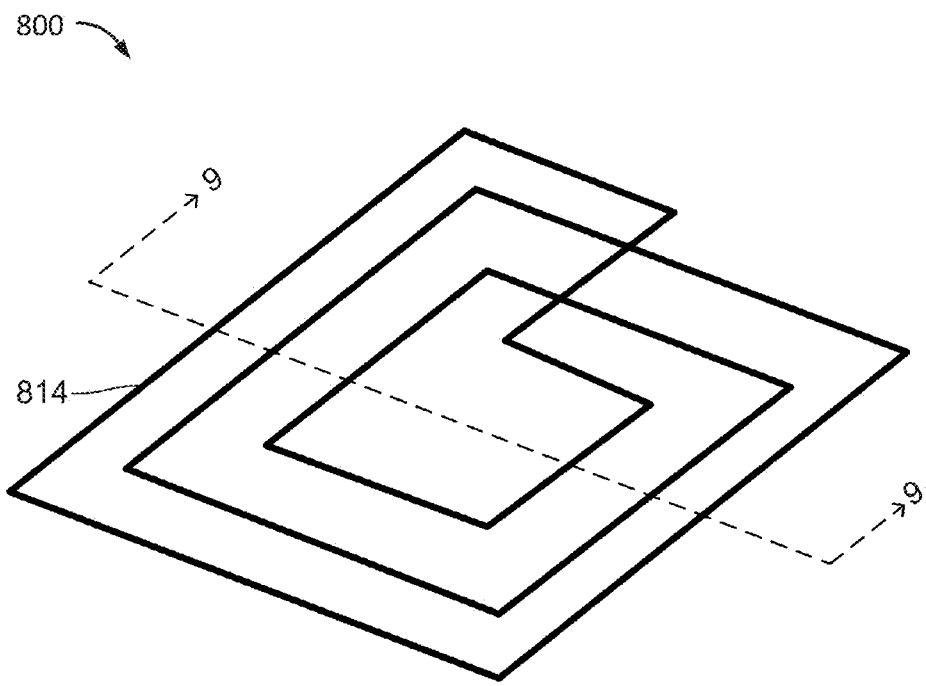
FIG. 8 shows a portion of a wireless power transmitter that includes a multi-turn transmit loop antenna.

FIG. 8 shows a portion of a wireless power transmitter 800 including a multi-turn transmit antenna 814. As shown in FIG. 8, the transmit antenna may comprise a plurality of turns. For example, the transmit antenna 814 may comprise a spiral inductor. Portions of the transmit antenna 814 may overlap where the windings intersect. The non-intersecting portions of the transmit antenna 814 may be planar (e.g., positioned in a plane). As such, the transmit antenna 814 may generally be referred to as a substantially planar transmit antenna. The transmit antenna 814 may comprise more turns and wiring in the center of the transmit antenna 814 as compared to the single loop transmit antenna 614 of FIG. 6. As such, the transmit antenna 814 may generate a more uniform magnetic field compared to the transmit antenna 614 of FIG. 6. Other, more complex transmit antenna designs (not shown) may comprise more turns or more wiring than the transmit antenna 814 and may provide a more uniform magnetic field compared to the transmit antenna 814. In general, as transmit antenna designs become more complicated (e.g., having more turns covering more area), they may generate a more uniform magnetic field, but may also become more expensive to manufacture. As described below, ferromagnetic materials may be shaped and positioned to improve the distribution of a magnetic field generated by a transmit antenna based on the strength and direction of the magnetic field.

Figure 9:
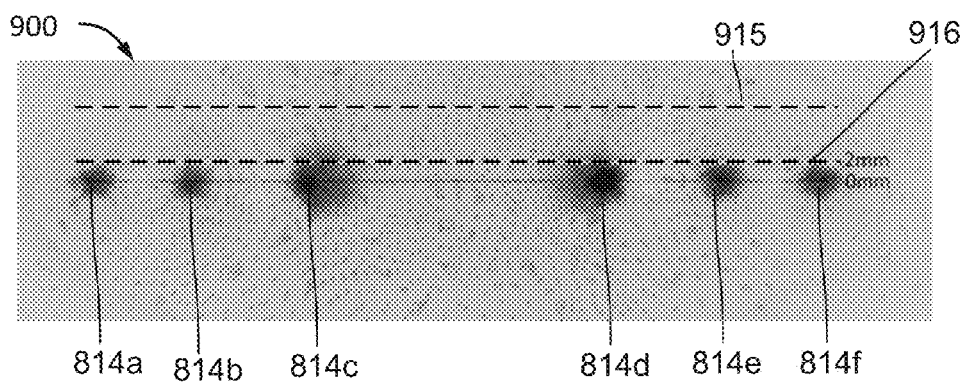
FIG. 9 is a cross-sectional view along line 9-9 of FIG. 8 showing a software simulated magnetic field generated by the transmit antenna.

FIG. 9 shows a diagram 900 of a simulated magnetic field generated by the transmit antenna 814 of FIG. 8. The diagram 900 shows a cross-sectional view taken generally on line 9-9 of FIG. 8. In the diagram 900, the darker colored regions in proximity to the windings of the transmit antenna 814 identify the areas having higher magnetic field strength (e.g., H-field). The diagram 900 shows that the magnetic field strength may be concentrated around the windings of the transmit antenna 814a-f. As shown in the diagram 900, the strength of the magnetic field may become more uniform as the distance from the transmit antenna 814 increases. As shown in FIG. 9, the variance in the strength, indicated by the varying darkness in the diagram 900, of the magnetic field across a line 915 farther from the transmit antenna 814 is less than the variance in the intensity of the magnetic field across a line 916 that is closer to the transmit antenna 814 (e.g., 2 mm distance above the transmit antenna 814).

Figure 10:
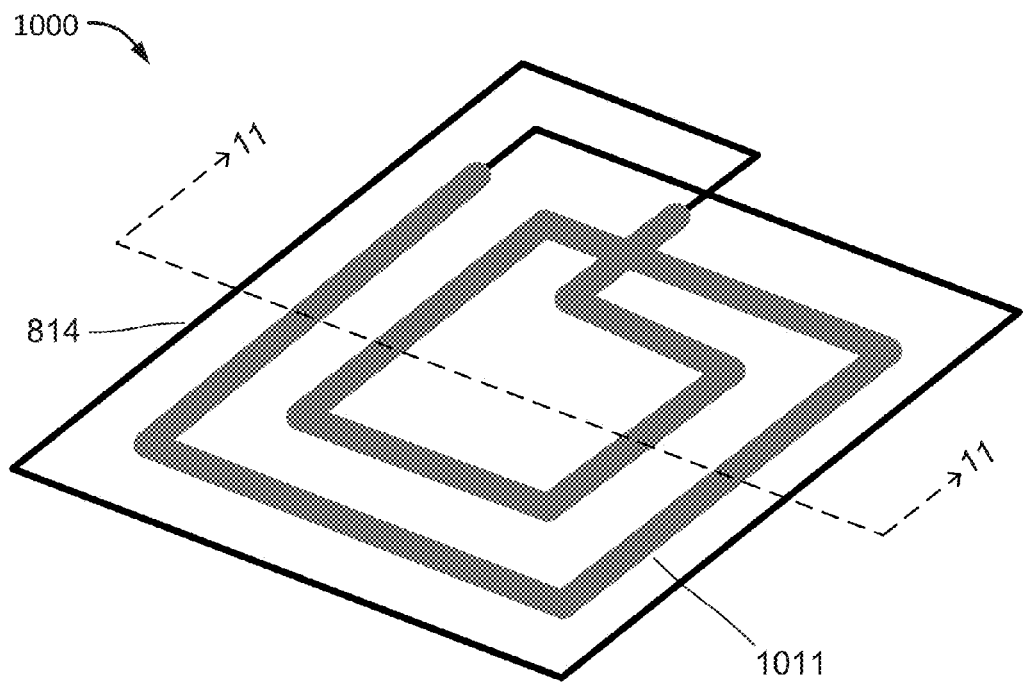
FIG. 10 is similar to FIG. 8 except ferromagnetic material is positioned about the transmit antenna to modify the distribution of the magnetic field.

FIG. 10 shows a portion of a wireless power transmitter 1000 including the multi-turn transmit antenna 814 of FIG. 8 and ferromagnetic material 1011 positioned to modify the distribution of the magnetic field. The ferromagnetic material 1011 may be positioned above a portion of the windings of the transmit antenna 814. In some embodiments, as described below with reference to FIG. 13, the transmit antenna 814 and the ferromagnetic material 1011 may be encased in a transmitter pad (not shown). The transmitter pad may comprise plastic, foam, or any other material suitable to support or enclose the transmit antenna 814 and the ferromagnetic material 1011. In some embodiments, the ferromagnetic material 1011 may be spaced apart from the transmit antenna 814 by the material of the transmitter pad.

The shape, positioning, and magnetic permeability of the ferromagnetic material 1011 of FIG. 10 may be selected based on the strength and direction of the magnetic field. The strength and direction of the magnetic field may be determined using magnetic simulation or by measuring the actual magnetic field generated by a transmit antenna. The shape and positioning of the ferromagnetic material 1011 was selected based on several iterations of simulation. The positioning of the ferromagnetic material was adjusted in each iteration in order to limit the amount of ferromagnetic material used. The amount of ferromagnetic material used may be limited in order to reduce manufacturing costs. This is because, in general, ferromagnetic material may be several times more expensive than a printed antenna circuit. Accordingly, the ferromagnetic material 1011 was selectively placed to be cost-efficient based on the improvement in magnetic field uniformity. The use of more ferromagnetic material may result in a more uniform magnetic field compared to the configuration of FIG. 10.

Figure 11:
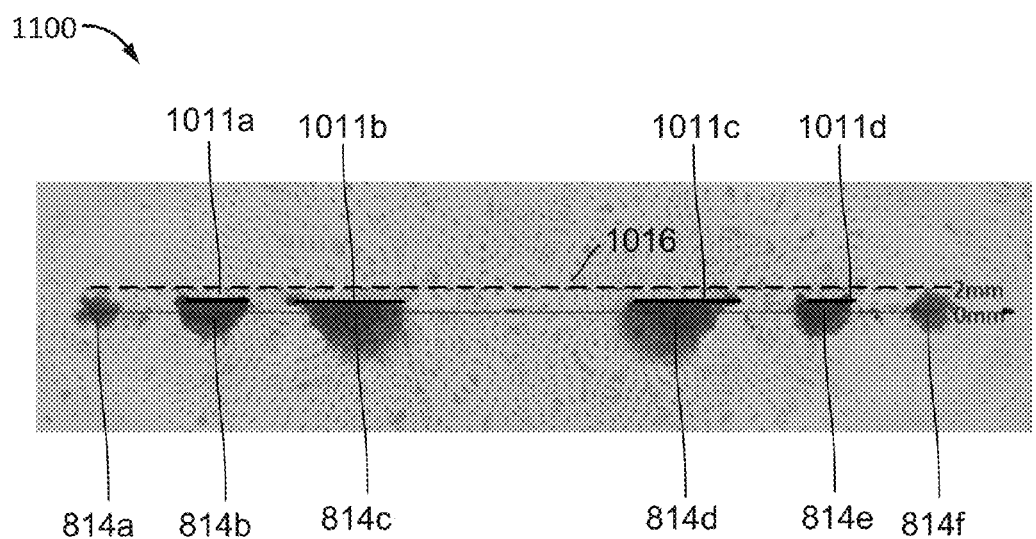
FIG. 11 is a cross-sectional view along line 11-11 of FIG. 10 of a software simulated magnetic field generated by the transmit antenna with ferromagnetic material positioned above the transmit antenna.

FIG. 11 shows a diagram 1100 of a simulated magnetic field generated by the transmit antenna 814 of FIG. 8 with ferromagnetic material 1011 positioned above the transmit antenna 814. The diagram 1100 shows a cross-sectional view taken generally on line 11-11 of FIG. 10. As described above, the ferromagnetic material 1011 positioned above the transmit antenna 814 may be configured to block at least a portion of the magnetic field from passing through the material. The diagram 1100 shows that the magnetic field may be concentrated around the windings of the transmit antenna 814a-f. The diagram 1100 also shows that the ferromagnetic material 1011a-d may improve the magnetic field uniformity (e.g., less variance in field intensity) along line 1016, close to the transmit antenna 814, as compared to the magnetic field distribution shown in diagram 900 of FIG. 9. A more uniform magnetic field closer to the transmit antenna 814 allows for a wireless power transmitter pad to have a thinner thickness compared to other wireless power transmitter pads that do not include ferromagnetic materials positioned as described herein.

Figure 12:
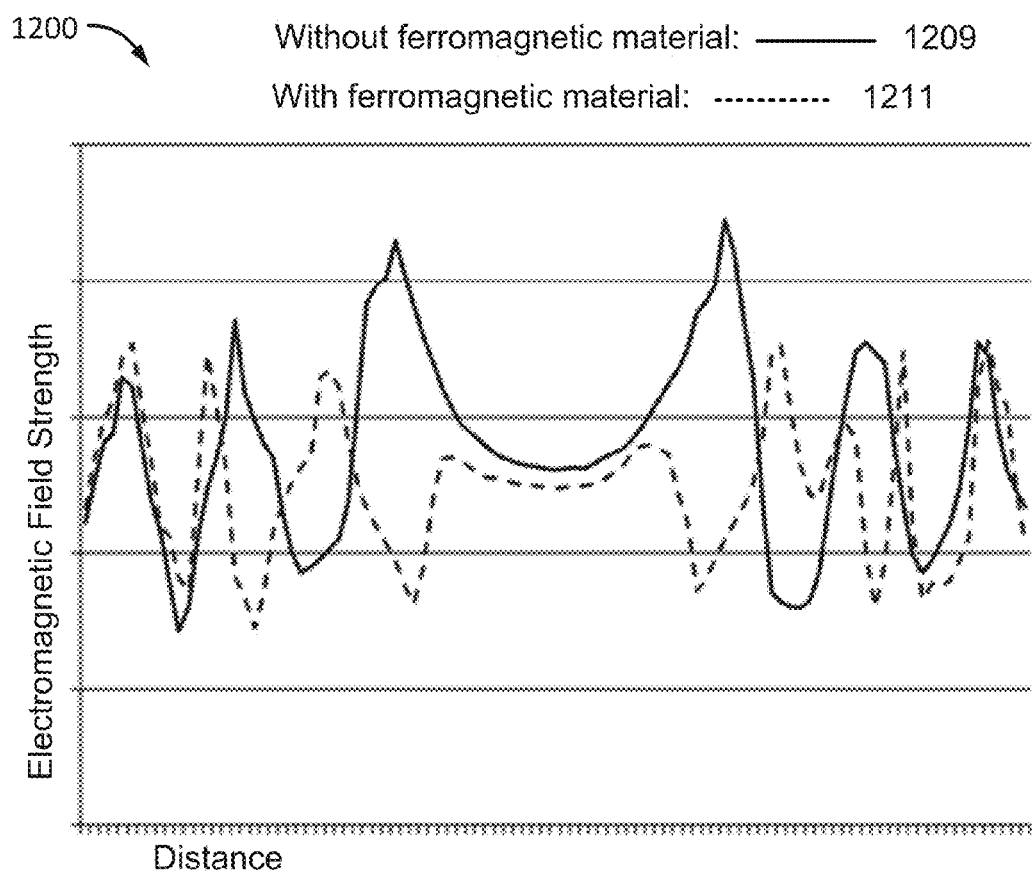
FIG. 12 shows a chart of the intensity of the simulated magnetic fields of FIGS. 9 and 11 across the surface of the wireless power transmitter.

FIG. 12 shows a chart 1200 graphing the intensity of the simulated magnetic fields of FIGS. 9 and 11. The solid line 1209 graphs the intensity of the magnetic field generated by the transmit antenna 814 of FIG. 9 without ferromagnetic material. The dotted lined 1211 graphs the intensity of the magnetic field generated by the transmit antenna 814 of FIG. 11 with the ferromagnetic material positioned to improve magnetic field uniformity. As shown in FIG. 12, ferromagnetic material positioned above the transmit antenna may at least reduce the maximum intensity of the magnetic field above the ferromagnetic material. FIG. 12 shows that positioning of the ferromagnetic material 1011 of FIG. 11 improves the uniformity (e.g., decreases the variance) of the magnetic field. Also, as described above with reference to FIG. 7, ferromagnetic material positioned below the transmit antenna, or between the wires (e.g., turns) of the transmit antenna, may act as a conduit and raise the intensity of the magnetic field in the areas above the ferromagnetic materials. Such improvements in magnetic field uniformity may provide the benefits of allowing a transmitter pad to provide proper voltage to a receiver regardless of the receiver's position on the pad and more efficient wireless power transfer as described above. Also, a more uniform magnetic field allows for wireless power receivers to operate within a smaller voltage range, reducing the complexity of the receiver design, increasing power transfer efficiency, and reducing manufacturing costs. In addition, the reduction in the maximum intensity of the magnetic field provided by the ferromagnetic material is beneficial because it may reduce electric shock and the risk of human hazard exposure.

Figure 13:
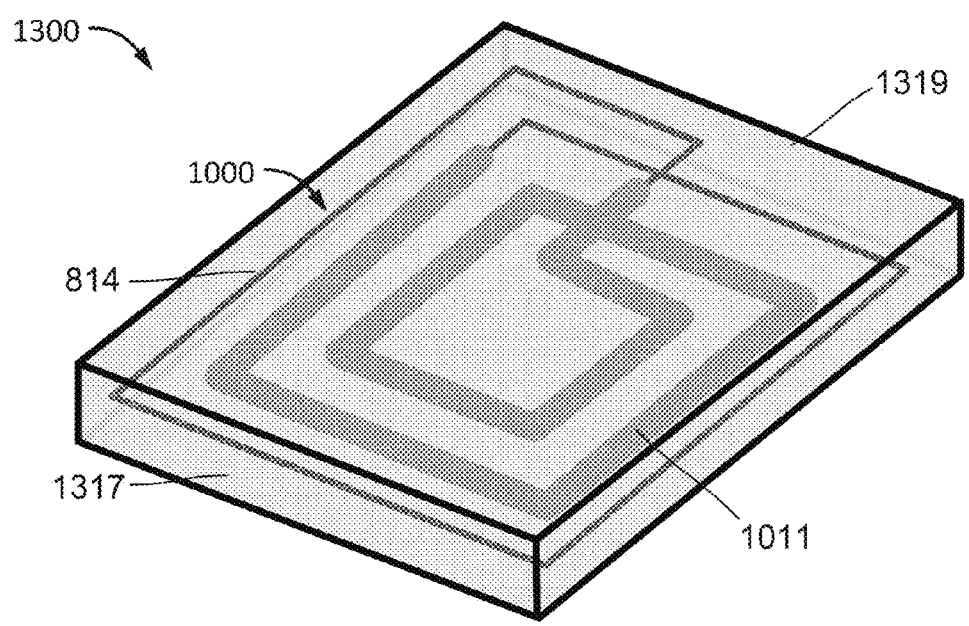
FIG. 13 shows a transmit antenna disposed within a wireless power transmitter pad.

FIG. 13 shows a wireless power transmitter pad 1300. The transmitter pad 1300 may be configured to house and support the wireless power transmitter 1000 of FIG. 10. The pad 1300 may generally be referred to as a housing. At least a portion of the transmitter pad 1300 may be formed of a support material 1317. The support material 1317 may comprise plastic, foam, metal, or any other suitable material. The support material 1317 may contain and support the antenna 814, the ferromagnetic material 1011, and other components of a wireless power transmitter 404 as described above with reference to FIG. 4. As such, the support material 1317 may be disposed between the ferromagnetic material 1011 and the transmit antenna 814. The transmitter pad 1300 may also comprise a charging surface 1319. The charging surface 1319 may be the surface of the transmitter pad 1300 that is above the transmit antenna 1317. Wireless power receivers, such as the wireless power receiver 508 as described above with reference to FIG. 5, may be positioned on the charging surface 1319 to receive charging power. In embodiments where the transmitter pad 1300 comprises metal, the transmitter pad 1300 itself may affect the distribution of the magnetic field and the shape of the transmitter pad 1300 may be selected to modify the distribution of the magnetic field generated by the transmit antenna 814.

Shaping and positioning ferromagnetic material 1011 to modify the distribution of the magnetic field is beneficial because it may provide a uniform magnetic field at a shorter distance (e.g., less than a thousandth of a wavelength of wireless power operation) from the transmit antenna 814 compared to other configurations not using ferromagnetic material to modify the magnetic field distribution. As such, the ferromagnetic material 1011 allows for a thinner transmitter pad 1300. A thinner transmitter pad is beneficial because it provides more convenient charging possibilities for users of wireless power devices.

FIGS. 14-21 show additional embodiments of wireless power transmitters that may comprise a transmit antenna and ferromagnetic material shaped or positioned to modify a magnetic field generated by the transmit antenna. The transmit antenna may be substantially planar. The wireless power transmitters of FIGS. 14-21 may be configured similar to the wireless power transmitter described above with reference to FIG. 4. The shape and positioning of the ferromagnetic material may be selected to modify the magnetic field to increase uniformity of the magnetic field at a charging surface of a transmitter pad configured to support the transmit antenna and ferromagnetic material. Such configurations are beneficial because they provide more efficient wireless charging as described above. As further described below, the shape and positioning of the ferromagnetic material may be selected based on a shape and positioning of a transmit antenna and a strength and a direction of a magnetic field generated by the transmit antenna. In addition, the magnetic permeability of the ferromagnetic material may also be selected in order to modify the magnetic field. A ferromagnetic material that is less magnetically permeable may allow a smaller portion of the magnetic field to pass through the material while a more magnetically permeable ferromagnetic material may allow more of the magnetic field to pass through the material. Accordingly, ferromagnetic material may be shaped, positioned, and have a magnetic permeability selected in order to increase the magnetic field in certain areas around a transmit antenna and to reduce (e.g., shield) the magnetic field in other areas. In FIGS. 14-31, a darker portion of the ferromagnetic material may have less magnetic permeability than a lighter portion of the ferromagnetic material. In some embodiments, different portions of the ferromagnetic material may be shaped or positioned differently to modify the magnetic field as further described below. In some embodiments, a wireless power transmitter may have a plurality of pieces of ferromagnetic material, each piece having a different shapes or position. In other embodiments, the ferromagnetic material may be shaped or positioned to achieve an intentionally non-uniform magnetic field.

In general, the ferromagnetic material in FIGS. 14-31 is shaped and positioned to decrease the concentration of the magnetic field in high concentration areas and to increase the concentration of the magnetic field in low concentration areas. As described above with reference to FIGS. 6-7, ferromagnetic material positioned below a transmit antenna or between windings of the transmit antenna may act as a conduct for the magnetic field. Positioning ferromagnetic material in low concentration areas (e.g., between the windings of the transmit antenna) may increase the concentration of the magnetic field in those areas. As described above with reference to FIGS. 8-13, the magnetic field may be concentrated around the windings of the transmit antenna and ferromagnetic material may be positioned above the windings to decrease the concentration of the magnetic field in such areas. For example, the ferromagnetic material may be positioned where the concentration of the magnetic field is at a local maximum or a local minimum, thereby improving the uniformity of the magnetic field.

As further described below, FIGS. 14-31 show different variations of ferromagnetic material shaping and positioning with respect to a transmit antenna having at least a portion of the transmit antenna positioned on the x-y plane. In some embodiments, the ferromagnetic material may be shaped as one or more flat sheets or layers. In some embodiments, the ferromagnetic material may be tapered in one or more directions (e.g., x, y, or z-axis). In some embodiments, the ferromagnetic material may have a non-continuous taper (e.g., steps). In some embodiments, the ferromagnetic material may have a non-planar curvature. In some embodiments, a first portion or layer of the ferromagnetic material may have a magnetic permeability that is different from a magnetic permeability of a second portion or layer of the ferromagnetic material. In some embodiments, each portion or layer of the ferromagnetic material may have a different thickness along the z-axis direction. In some embodiments, each portion or layer may have the same thickness. In some embodiments, each portion or layer of the ferromagnetic material may have a different length along the x-axis. In some embodiments, each portion or layer may have the same length. In some embodiments, each portion or layer of the ferromagnetic material may have a different width in the y-axis. In some embodiments, each portion or layer may have the same width. In some embodiments, at least a portion of the ferromagnetic material may be positioned above at least a portion the transmit antenna along the z-axis. In some embodiments, a portion of the ferromagnetic material may be positioned below the transmit antenna along the z-axis. In some embodiments, a first portion of the ferromagnetic material may be positioned above a portion of the transmit antenna and a second portion of the ferromagnetic material may be positioned below a portion of the transmit antenna along the z-axis. In some embodiments, the ferromagnetic material may be positioned between a turn (e.g., winding) of the transmit antenna. Such variations in the shape and position of the ferromagnetic material are further described below.

Figure 14:
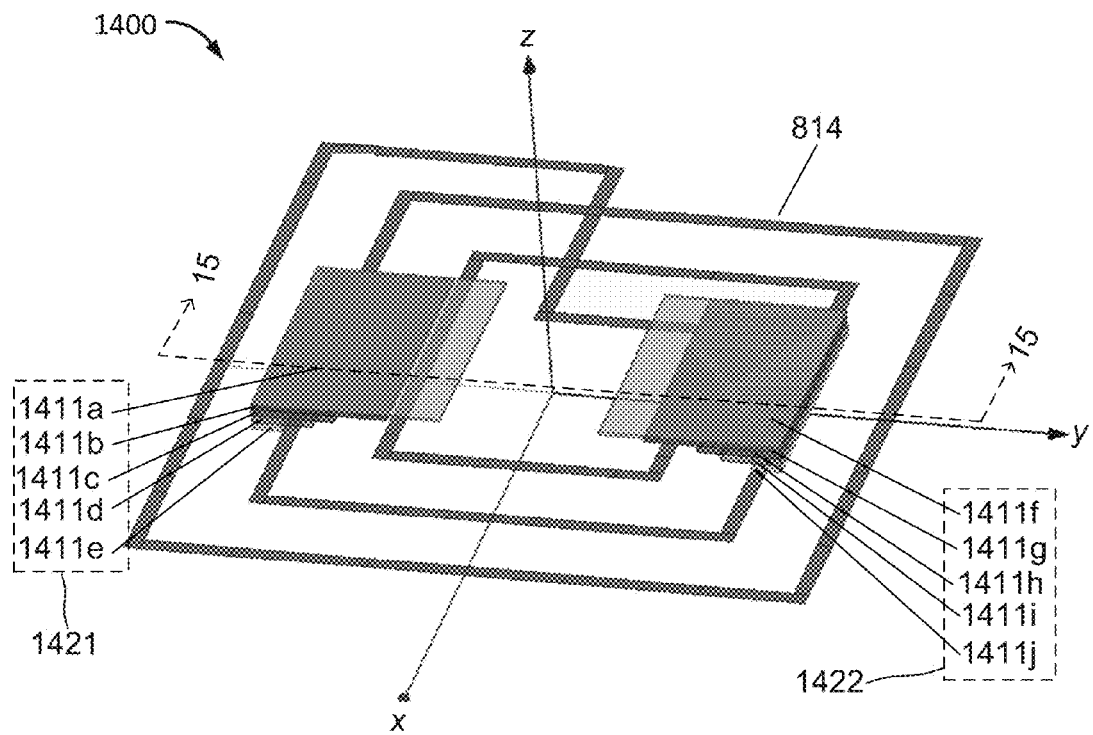
FIG. 14 shows a portion of a wireless power transmitter that includes ferromagnetic material and a transmit antenna.

FIG. 14 shows a wireless power transmitter 1400 comprising ferromagnetic material 1411 and a transmit antenna 814. The ferromagnetic material 1411 may be shaped and positioned to modify uniformity of a magnetic field generated by the transmit antenna 814 as described above. The ferromagnetic material 1411 may be shaped and positioned to provide a uniform magnetic field at a charging surface of a transmitter pad (not shown). The ferromagnetic material 1411 may comprise a first piece of ferromagnetic material 1421 comprising five portions or layers of ferromagnetic material 1411a-e, each portion 1411a-e having a different magnetic permeability from the other portions 1411a-e in the piece of ferromagnetic material. The ferromagnetic material may also comprise a second piece of ferromagnetic material 1422 comprising five portions or layers of ferromagnetic material 1411g-j, each portion 1411f-j having a different magnetic permeability from the other portions 1411g-j in the piece of ferromagnetic material.

The first piece of ferromagnetic material 1421 may be positioned above the transmit antenna 814 in the z-axis and to the left, in the negative y-axis dimension. The first piece 1421 and the second piece 1422 of ferromagnetic material may be symmetric around the z-axis. As such, the second piece 1422 may be positioned above the transmit antenna 814 in the z-axis and to the right, in the positive y-axis dimension. Each group of ferromagnetic material may be shaped to have four steps. Portions 1411a, c, f, and g may be thinner (along the z-axis) than the other portions 1411c, d, e, h, i, and j. Each of the portions 1411a-j may have the same length along the x-axis but may have different widths along the y-axis. The lower portions 1411e and j of each group may be positioned directly above the transmit antenna 814. The ferromagnetic material 1411 may overhang the transmit antenna 814 (e.g., in the y-axis) by a distance that is one tenth to several times of a trace width of the windings of the transmit antenna 814. In some embodiments the portions 1411a-j may be supported by the transmit antenna 814. In some embodiments the portions 1411a-j may be support by support material of a transmitter pad (not shown).

Each portion of the ferromagnetic material 1411a-j may have a magnetic permeability. In this embodiment, the magnetic permeability of each portion of ferromagnetic material 1411a-j may decrease as the distance from the transmit antenna 814 increases. In other embodiments, the magnetic permeability of the ferromagnetic material 1411 may increase as the distance from the transmit antenna increases. In this embodiment, portions 1411e and 1411j and more magnetically permeable than portions 1411d and 1411i, which are more magnetically permeable than portions 1411c and 1411h, which are more magnetically permeable than portions 1411b and 1411g, which are more magnetically permeable than portions 1411a and 1411f. As described above, the shape and positioning of the ferromagnetic material 1411 may be based on the strength and direction of the magnetic field generated by the transmit antenna 814. The ferromagnetic material 1411 may be selected by an iterative process using magnetic simulation software that models the magnetic field generated by the transmit antenna 814 as modified by the ferromagnetic material 1411 such that the magnetic field strength near the transmit antenna 814 is similar to the strength in open areas (e.g., away from the transmit antenna 814) as measured at the charging surface.

Figure 15:
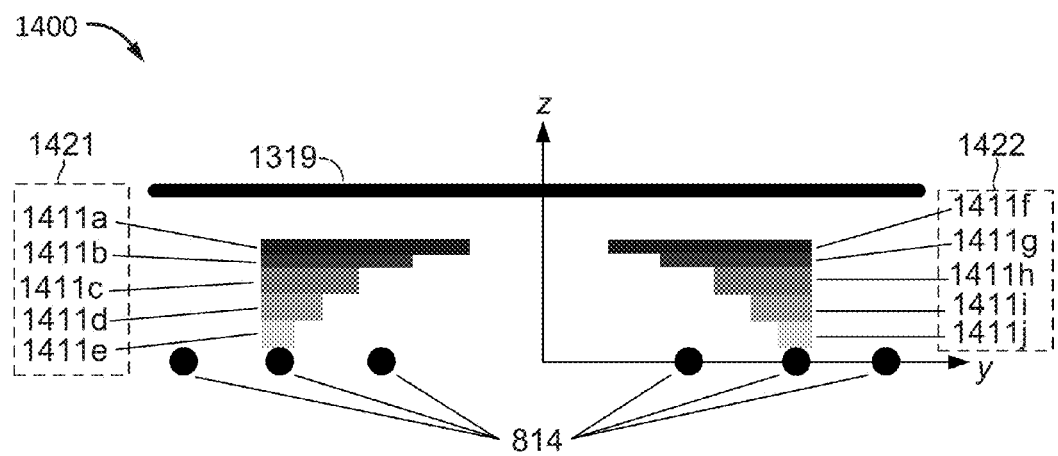
FIG. 15 shows a cross-section view along line 15-15 of FIG. 14.

FIG. 15 shows a cross-section view of the transmitter 1400 of FIG. 14 taken generally on line 15-15 of FIG. 14. As described above, the charging pad (not shown) of the transmitter 1400 may comprise a charging surface 1319 positioned above the transmit antenna 814 along the z-axis. At least a portion of the charging surface 1319 may be positioned in the same plane as at least a portion of the transmit antenna 814 (e.g., the x-y plane). As described above, the ferromagnetic material 1411 may be shaped and positioned with respect to the transmit antenna 814 to modify a magnetic field generated by the transmit antenna 814 in order to create a uniform electromagnetic field at the charging surface 1319.

Figure 16:
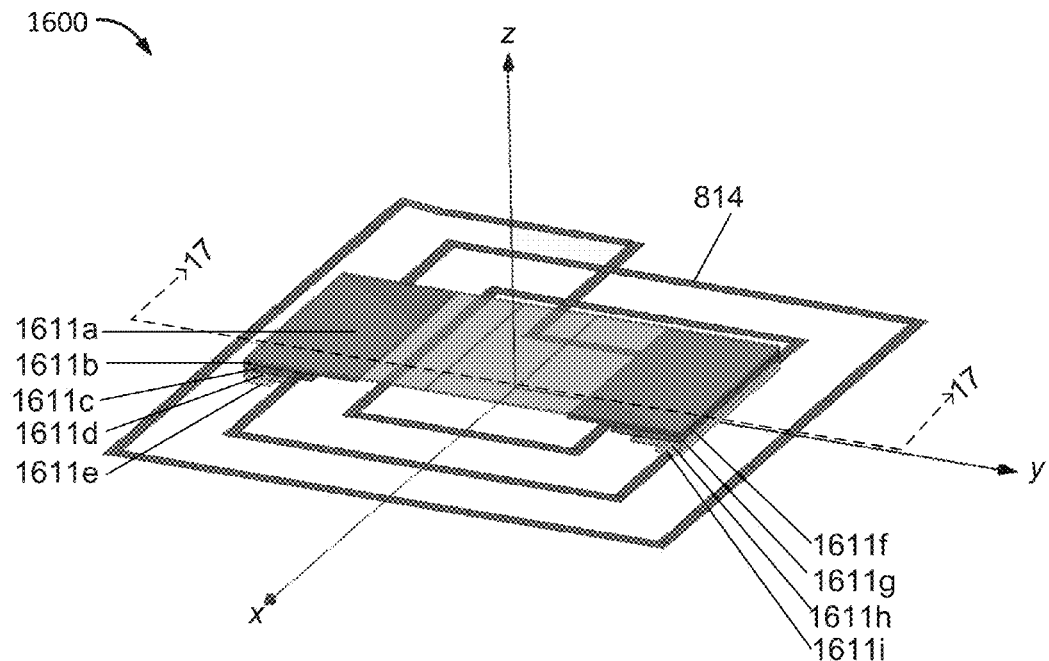
FIG. 16 shows a portion of a wireless power transmitter that includes ferromagnetic material.

FIG. 16 shows a wireless power transmitter 1600 comprising ferromagnetic material 1611 and a transmit antenna 814. The ferromagnetic material 1611 may be shaped and positioned to modify uniformity of a magnetic field generated by the transmit antenna 814 as described above. The ferromagnetic material 1611 may be shaped and positioned to improve uniformity of the magnetic field at a charging surface of a transmitter pad (not shown). The ferromagnetic material 1611 may comprise nine portions of ferromagnetic material 1611a-i, each portion 1611a-i having a magnetic permeability. The magnetic permeability of the portions 1611a-i may decease with increasing position in the z-axis. The ferromagnetic material 1611 may be position above the transmit antenna 814 in the z-axis. The ferromagnetic material 1611 may be supported by the transmitter pad (not shown). As described above, the shape and positioning of the ferromagnetic material 1611 may be based on the strength and direction of the magnetic field generated by the transmit antenna 814. The ferromagnetic material 1611 may be selected by an iterative process using magnetic simulation software that models the magnetic field generated by the transmit antenna 814 as modified by the ferromagnetic material 1611 such that the magnetic field strength near the transmit antenna 814 is similar to the strength in open areas (e.g., away from the transmit antenna 814) as measured at the charging surface.

Figure 17:
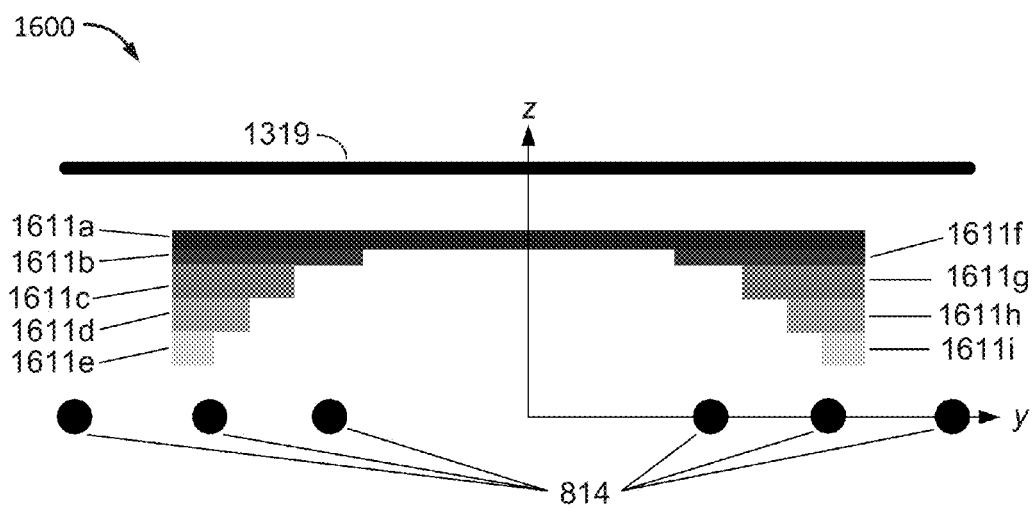
FIG. 17 shows a cross-section view along line 17-17 of FIG. 16.

FIG. 17 shows a cross-section view of the transmitter 1600 of FIG. 16 taken generally on line 17-17 of FIG. 16. As described above, the charging pad (not shown) of the transmitter 1600 may comprise a charging surface 1319 positioned above the transmit antenna 814 along the z-axis. At least a portion of the charging surface 1319 may be positioned in the same plane as at least a portion of the transmit antenna 814 (e.g., the x-y plane). As described above, the ferromagnetic material 1611 may be shaped and positioned with respect to the transmit antenna 814 to modify a magnetic field generated by the transmit antenna 814 in order to create a uniform magnetic field at the charging surface 1319.

Figure 18:
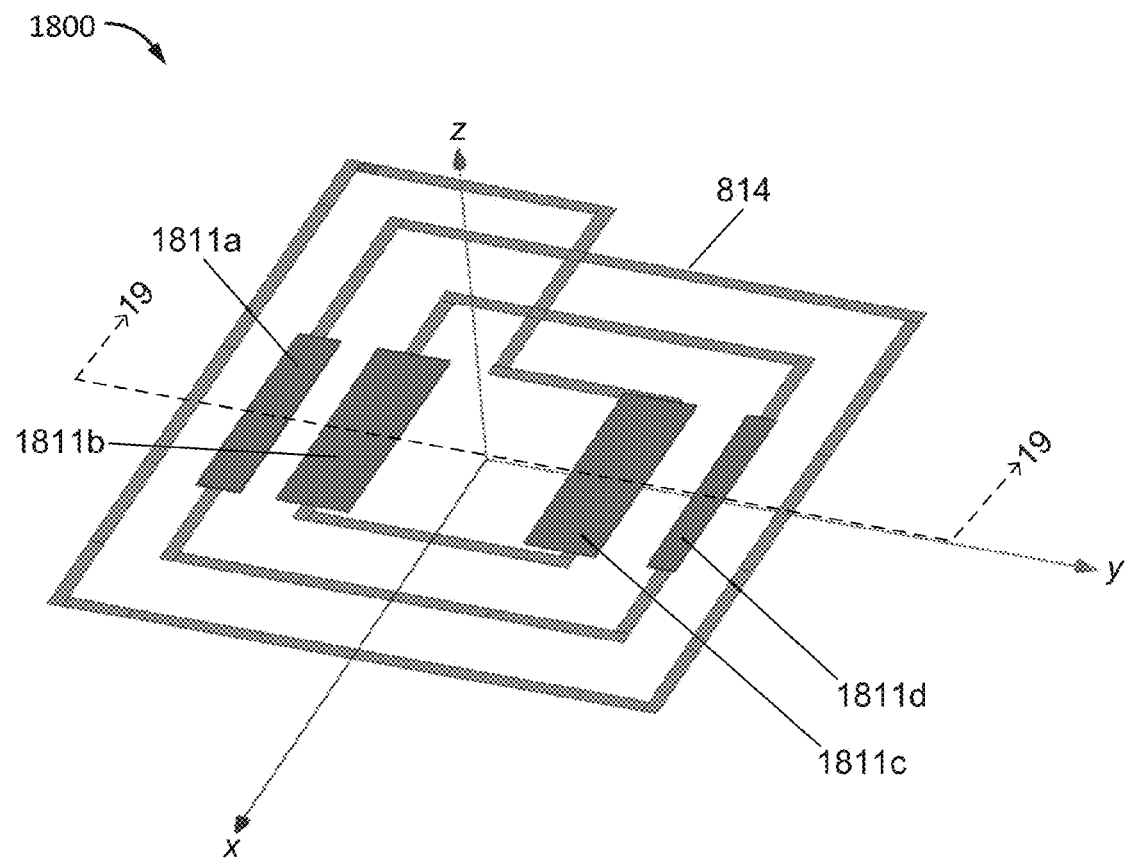
FIG. 18 shows a portion of a wireless power transmitter that includes ferromagnetic material.

FIG. 18 shows a wireless power transmitter 1800 comprising ferromagnetic material 1811 and a transmit antenna 814. The ferromagnetic material 1811 may be shaped and positioned to modify uniformity of a magnetic field generated by the transmit antenna 814 as described above. The ferromagnetic material 1811 may be shaped and positioned to provide a uniform magnetic field at a charging surface of a transmitter pad (not shown). The ferromagnetic material 1811 may comprise multiple separate portions of ferromagnetic material 1811a-d. Each portion of ferromagnetic material 1811a-d may have a magnetic permeability that is the same as a magnetic permeability of the other portions 1811a-d. The ferromagnetic material 1811 may be position above the transmit antenna 814 in the z-axis. Each portion of the ferromagnetic material 1811a-d may be positioned along a portion of a winding of the transmit antenna 814. As described above with reference to FIGS. 9, and 11, the magnetic field generated by the transmit antenna 814 may be concentrated around the windings of the transmit antenna 814. Positioning the ferromagnetic material 1811a-d along a portion of the windings of the transmit antenna 814 may decrease the concentration of the magnetic field, thereby improving magnetic field uniformity. As described above, the shape and positioning and permeability of the ferromagnetic material 1811 may be based on the strength and direction of the magnetic field generated by the transmit antenna 814. The ferromagnetic material 1811 may be selected by an iterative process using magnetic simulation software that models the magnetic field generated by the transmit antenna 814 as modified by the ferromagnetic material 1811 such that the magnetic field strength near the transmit antenna 814 is similar to the strength in open areas (e.g., away from the transmit antenna 814) as measured at the charging surface.

Figure 19:
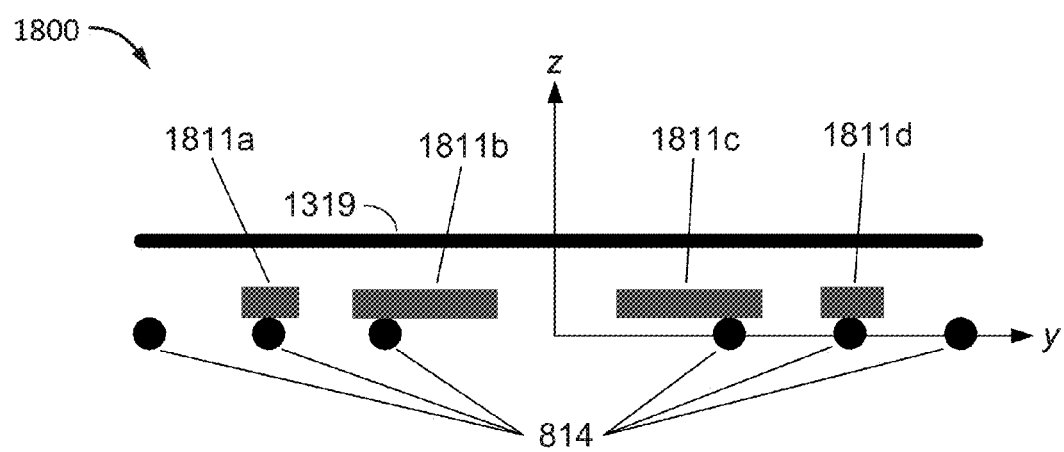
FIG. 19 shows a cross-section view along line 19-19 of FIG. 18.

FIG. 19 shows a cross-section view of the transmitter 1800 of FIG. 18 taken generally on line 19-19 of FIG. 18. As described above, the charging pad (not shown) of the transmitter 1800 may comprise a charging surface 1319 positioned above the transmit antenna 814 along the z-axis. At least a portion of the charging surface 1319 may be positioned in the same plane as at least a portion of the transmit antenna 814 (e.g., the x-y plane). As described above, the ferromagnetic material 1811 may be shaped and positioned with respect to the transmit antenna 814 to modify a magnetic field generated by the transmit antenna 814 in order to increase uniformity of the magnetic field at the charging surface 1319.

Figure 20:
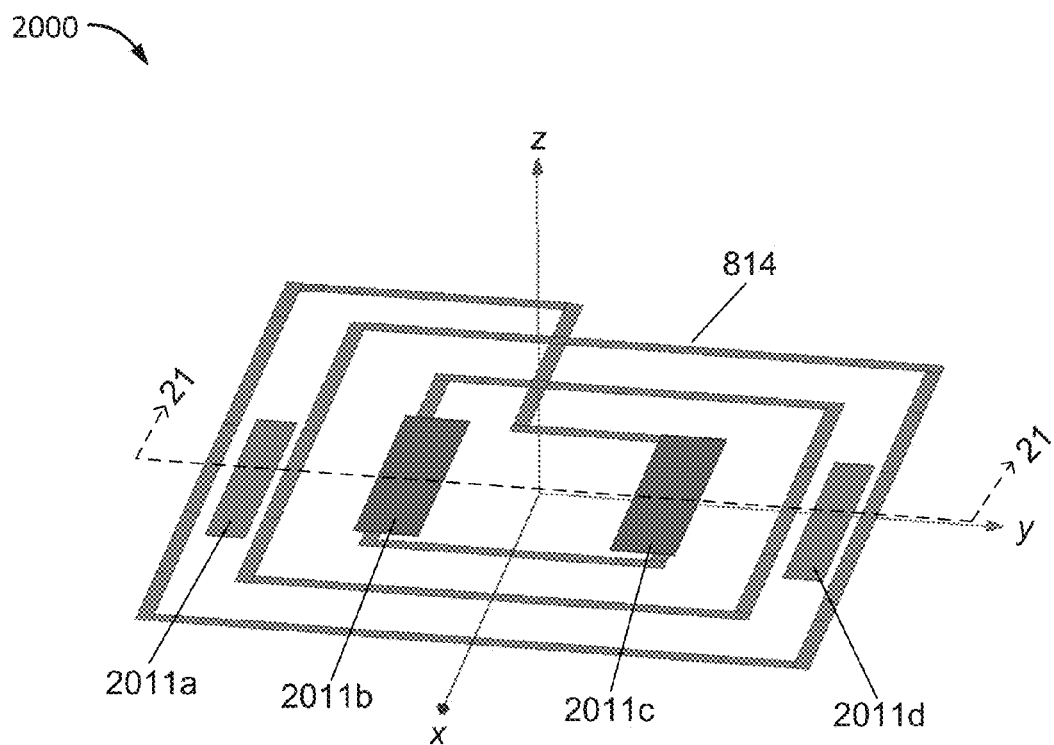
FIG. 20 shows a portion of a wireless power transmitter that includes ferromagnetic material.

FIG. 20 shows a wireless power transmitter 2000 comprising ferromagnetic material 2011 and a transmit antenna 814. The ferromagnetic material 2011 may be shaped and positioned to modify uniformity of a magnetic field generated by the transmit antenna 814 as described above. The ferromagnetic material 2011 may be shaped and positioned to provide a uniform magnetic field at a charging surface of a transmitter pad (not shown). The ferromagnetic material 2011 may comprise four portions of ferromagnetic material 2011a-d. Each portion of ferromagnetic material 2011a-d may have a magnetic permeability. Portions 2011a and 2011*d* may have the same magnetic permeability. Portions 2011*b* and 2011*c* may have the same magnetic permeability. The magnetic permeability of portions 2011*b* and 2011*c* may be less than the magnetic permeability of portions 2011*a* and 2011*d*. Portions 2011*b* and 2011*b* may be position above the transmit antenna 814 in the z-axis. Portions 2011*a* and 2011*d* may be position below the transmit antenna 814 in the z-axis. Portion 2011*b* and 2011*c* may be positioned along a portion of a winding of the transmit antenna 814. Portions 2011*a* and 2011*d* may be positioned between the windings of the transmit antenna 814 in the x-y plane. As described above with reference to FIG. 7, portions 2011*a* and 2011*d* of the ferromagnetic material positioned below the transmit antenna 814 may be configured to act as a conduit for the magnetic field generated by the transmit antenna 814. Positioning the ferromagnetic material 2011*a* and 2011*d* as shown in FIG. 20 may increase the concentration of the magnetic field between the windings of the antenna 814. Also, positioning the ferromagnetic material 2011*b* and 2011*c* along a portion of the windings of the transmit antenna 814 may decrease the concentration of the magnetic field around the windings. Accordingly, the ferromagnetic material 2011*a-d* may modify the magnetic field to be uniform at the charging surface. As described above, the shape and positioning of the ferromagnetic material 1811 may be based on the strength and direction of the magnetic field generated by the transmit antenna 814. The ferromagnetic material 1811 may be selected by an iterative process using magnetic simulation software that models the magnetic field generated by the transmit antenna 814 as modified by the ferromagnetic material 1811 such that the magnetic field strength near the transmit antenna 814 is similar to the strength in open areas (e.g., away from the transmit antenna 814) as measured at the charging surface.

Figure 21:
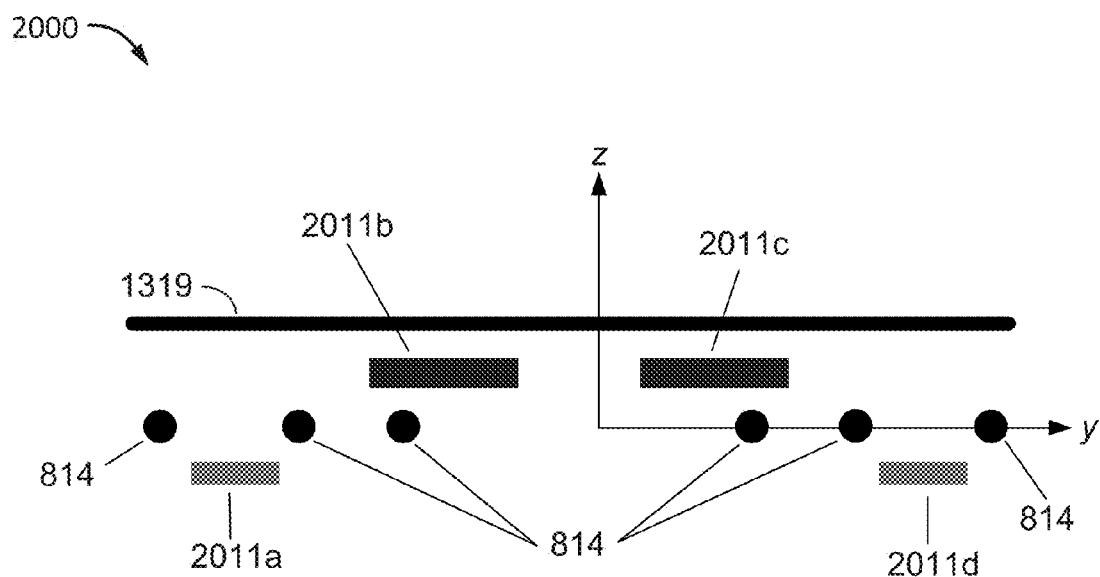
FIG. 21 shows a cross-section view along line 21-21 of FIG. 20.

FIG. 21 shows a cross-section view of the transmitter 2000 of FIG. 20 taken generally on line 21-21 of FIG. 20. As described above, the charging pad (not shown) of the transmitter 2000 may comprise a charging surface 1319 positioned above the transmit antenna 814 along the z-axis. At least a portion of the charging surface 1319 may be positioned in the same plane as at least a portion of the transmit antenna 814 (e.g., the x-y plane). As described above, the ferromagnetic material 2011 may be shaped and positioned with respect to the transmit antenna 814 to modify a magnetic field generated by the transmit antenna 814 in order to create a uniform magnetic field at the charging surface 1319.

FIGS. 22-27 show additional cross-section views of wireless power transmitters comprising ferromagnetic material shaped and positioned in relation to windings of a transmit antenna. The wireless power transmitters of FIGS. 12-27 may be configured similar to the wireless power transmitter described above with reference to FIG. 4. As described above, the ferromagnetic material may be shaped and positioned to increase uniformity of the magnetic field at a charging surface of a transmitter pad.

Figure 22:
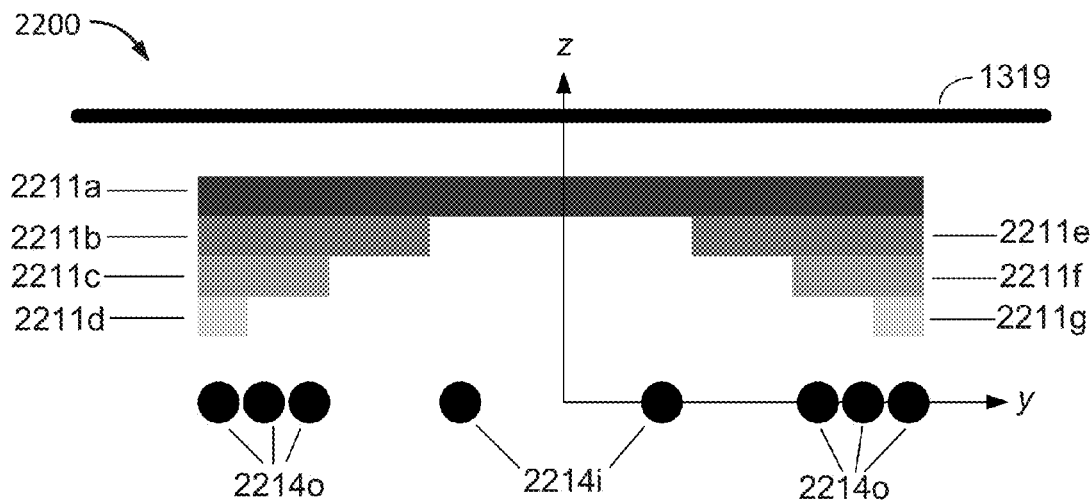
FIG. 22 shows a cross-section view of a wireless power transmitter that includes ferromagnetic material and a transmit antenna, according to an embodiment.

FIG. 22 shows a cross-section view of a wireless power transmitter 2200 comprising ferromagnetic material 2211 and a transmit antenna 2214. The transmit antenna 2214 may be substantially planar. The transmitter 2200 may also comprise a charging pad having a charging surface 1319 as described above. The strength and direction of the magnetic field generated by the transmit antenna 2314 may be based on the positioning of the windings, as described above with reference to FIGS. 9 and 11. Accordingly, the ferromagnetic material 2211 may be shaped and positioned with respect to windings of the transmit antenna 2214 to provide a uniform magnetic field at the charging surface 1319. The ferromagnetic material may comprise seven portions 2211*a-g*. Portions 2211*d* and 2211*g* may be more magnetically permeable than portions 2211*c* and 2211*f*. Portions 2211*c* and 2211*f* may be more magnetically permeable than portions 2211*b* and 2211*e*. Portions 2211*b* and 2211*e* may be more magnetically permeable than portion 2211*a*. The transmit antenna 2214 may comprise four windings that may be symmetric around the z-axis. The transmit antenna 2214 may comprise three outer windings 2214*o* that are positioned close to one another. The transmit antenna 2214 may also comprise one inner winding 2214*i* that may be positioned near the center with respect to the z-axis. The outer windings 2214*o* may be positioned further along than y-axis compared to the inner winding 2214*i*. In order to reduce the concentration of the magnetic field near the three outer windings 2214*o*, ferromagnetic material portions 2211*b-d* and portions 2211*e-g* are positioned over the three outer windings 2214*o*. Only portion 2211*a* is positioned across the center since the concentration of the magnetic field is lower near a center of the transmit antenna 2214 as described with respect to FIG. 6 above. As such, the ferromagnetic material 2211 may be shaped, positioned, and have a magnetic permeability selected in order to provide a uniform magnetic field at a charging surface 1319 of the transmitter 2200.

Figure 23:
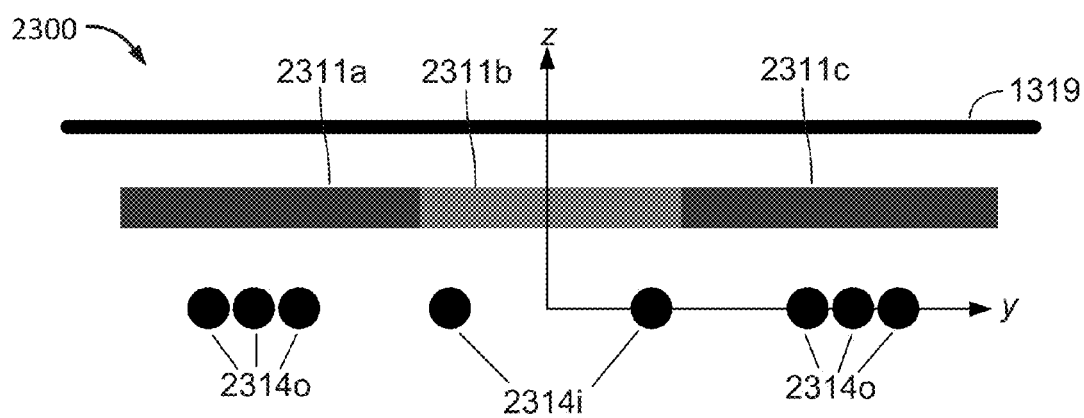
FIG. 23 shows a cross-section view of a wireless power transmitter that includes ferromagnetic material and a transmit antenna, according to another embodiment.

FIG. 23 shows a cross-section view of a wireless power transmitter 2300 comprising ferromagnetic material 2311 and a transmit antenna 2314. The transmit antenna 2314 may be substantially planar. The transmitter 2300 may also comprise a charging pad having a charging surface 1319 as described above. The ferromagnetic material may comprise three portions 2311*a-c*. The strength and direction of the magnetic field generated by the transmit antenna 2314 may be based on the positioning of the windings, as described above with reference to FIGS. 9 and 11. Accordingly, the ferromagnetic material 2311 may be shaped and positioned with respect to windings of the transmit antenna 2314 to provide a uniform magnetic field at the charging surface 1319. The transmit antenna 2314 may comprise four windings that may be symmetric around the z-axis. The transmit antenna 2314 may comprise three outer windings 2314*o* positioned close to one another. The transmit antenna 2314 may also comprise one inner winding 2314*i* positioned near the center with respect to the z-axis. The outer windings 2314*o* may be positioned further along than y-axis compared to the inner winding 2314*i*. The magnetic field generated by the transmit antenna 2314 may be more concentrated near the three outer windings. In order to reduce the concentration of the magnetic field near the three outer windings, ferromagnetic material portions 2311*a* and 2311*c* may be positioned over the three outer windings and may overlap the outer windings. The portion of ferromagnetic material 2311*b* may be positioned above the inner winding of the transmit antenna 2314. The portions 2311*a* and 2311*c* may be selected to be less magnetically permeable than the portion 2311*b* since the magnetic field may be concentrated near the outer windings 2314*o*. The center of the transmit antenna 2314 may have a lower concentration of the magnetic field as described with respect to FIG. 6 above. As such, the ferromagnetic material 2311 may be shaped, positioned, and have a magnetic permeability selected in order to provide a uniform magnetic field at a charging surface 1319 of the transmitter 2300.

Figure 24:
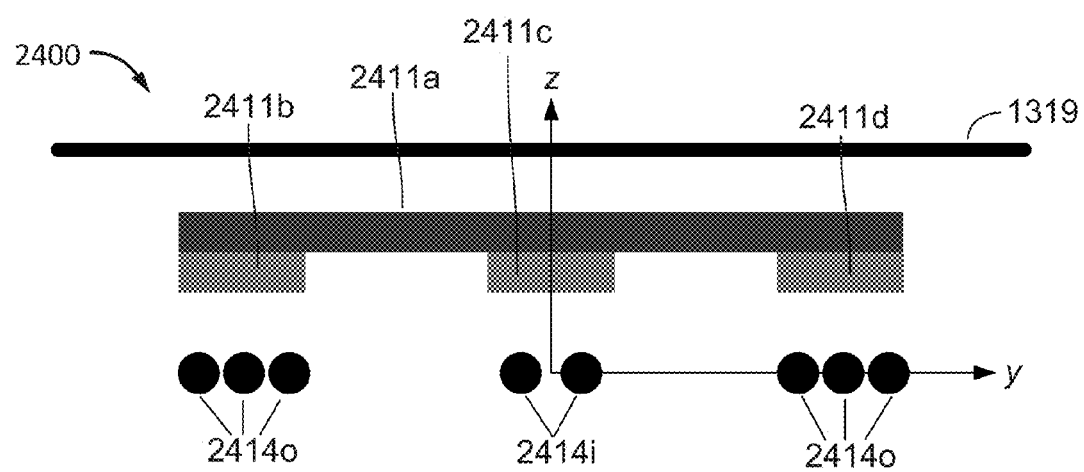
FIG. 24 shows a cross-section view of a wireless power transmitter that includes ferromagnetic material and a transmit antenna, according to another embodiment.

FIG. 24 shows a cross-section view of a wireless power transmitter 2400 comprising ferromagnetic material 2411 and a transmit antenna 2414. The transmit antenna 2414 may be substantially planar. The transmitter 2400 may also comprise a charging pad having a charging surface 1319 as described above. The ferromagnetic material may comprise four portions 2411*a-d*. The strength and direction of the magnetic field generated by the transmit antenna 2414 may be based on the positioning of the windings, as described above with reference to FIGS. 9 and 11. Accordingly, the ferromagnetic material 2411 may be shaped and positioned with respect to windings of the transmit antenna 2414 to provide a more uniform magnetic field at the charging surface 1319. The transmit antenna 2414 may comprise four windings that may be symmetric around the z-axis. The transmit antenna 2414 may comprise three outer windings 2414*o* that are positioned close to one another and one inner winding 2414*i* positioned close to itself. The inner winding 2414*i* may be positioned near the center with respect to the z-axis. The outer windings 2414*o* may be positioned further along than y-axis compared to the inner winding 2414*i*. The magnetic field generated by the transmit antenna 2414 may be more concentrated near the three outer windings 2414*o* and near the inner winding 2414*i*. In order to reduce the concentration of the magnetic field near the inner winding 2414*i* and outer windings 2414*o*, portions of ferromagnetic material 2411*b* and 2411*d* may be positioned above the three outer windings 2414*o* and portion of ferromagnetic material 2411*c* may be positioned above the inner winding 2414*i*. The portion 2411*b* may be positioned above the inner winding of the transmit antenna 2414. The portion 2411*a* may be positioned above the other portions 2411*b-d* and may be positioned above the inner and outer windings of the antenna 2414. The portions 2411*b*, 2411*c*, and 2411*d* may be selected to be less magnetically permeable than the portion 2411*a*. The center of the transmit antenna 2414 may have a lower concentration of the magnetic field as described with respect to FIG. 6 above. As such, the ferromagnetic material 2411 may be shaped, positioned, and have a magnetic permeability selected in order to provide a more uniform magnetic field at a charging surface 1319 of the transmitter 2400.

Figure 25:
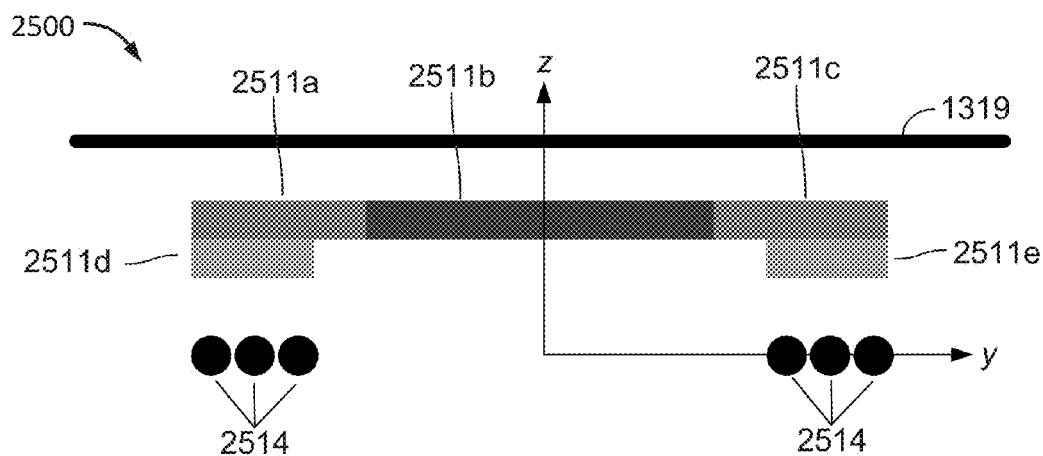
FIG. 25 shows a cross-section view of a wireless power transmitter that includes ferromagnetic material and a transmit antenna, according to another embodiment.

FIG. 25 shows a cross-section view of a wireless power transmitter 2500 comprising ferromagnetic material 2511 and a transmit antenna 2514. The transmit antenna 5214 may be substantially planar. The transmitter 2500 may also comprise a charging pad having a charging surface 1319 as described above. The ferromagnetic material may comprise five portions 2511*a-e*. The strength and direction of the magnetic field generated by the transmit antenna 2514 may be based on the positioning of the windings, as described above with reference to FIGS. 9 and 11. Accordingly, the ferromagnetic material 2511 may be shaped and positioned with respect to windings of the transmit antenna 2514 to provide a uniform magnetic field at the charging surface 1319. The transmit antenna 2514 may comprise three windings that may be symmetric around the z-axis as shown in FIG. 25. The magnetic field generated by the transmit antenna 2514 may be concentrated near the three windings. In order to reduce the concentration of the magnetic field near the windings, portions of ferromagnetic material 2511*a*, 2511*c*, 2511*d*, and 2511*e* may be positioned above the three windings. Portion of ferromagnetic material 2511*b* may be positioned above the transmit antenna 2514 in between portions 2511*a* and 2511*c* as shown in FIG. 25. The portions 2511*d* and 2511*e* may be selected to be more magnetically permeable than the portions 2511*a* and 2511*c*. The portion 2511*b* may be less magnetically permeable than the other portions 2511*a*, 2511*c*, 2511*d*, and 2511*e*. As described above, the ferromagnetic material 2511 may be shaped, positioned, and have a magnetic permeability selected in order to provide a uniform magnetic field at a charging surface 1319 of the transmitter 2500.

Figure 26:
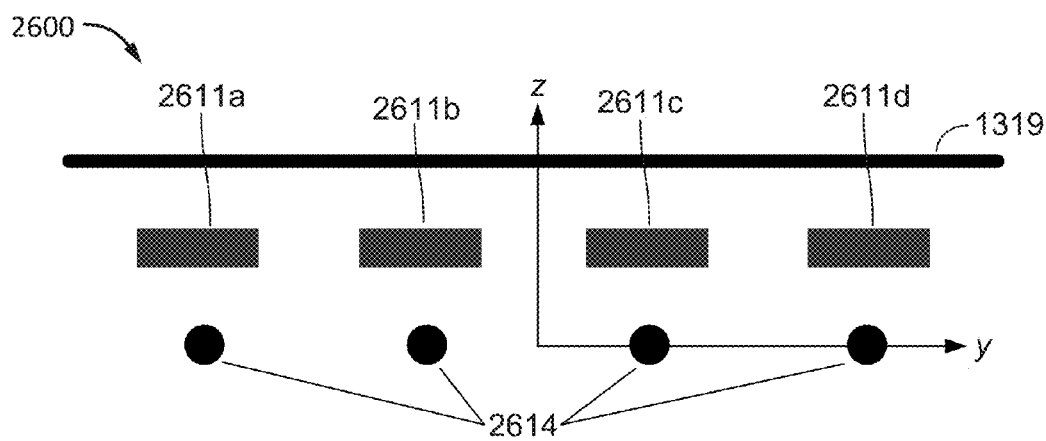
FIG. 26 shows a cross-section view of a wireless power transmitter that includes ferromagnetic material and a transmit antenna, according to another embodiment.

FIG. 26 shows a cross-section view of a transmitter 2600 comprising ferromagnetic material 2611 and a transmit antenna 2614. The transmit antenna 2614 may be substantially planar. The transmitter 2600 may also comprise a charging pad having a charging surface 1319 as described above. The ferromagnetic material may comprise four portions 2611*a-d*. The strength and direction of the magnetic field generated by the transmit antenna 2614 may be based on the positioning of the windings, as described above with reference to FIGS. 9 and 11. Accordingly, the ferromagnetic material 2611 may be shaped and positioned with respect to windings of the transmit antenna 2614 to provide a uniform magnetic field at the charging surface 1319. The transmit antenna 2614 may comprise two windings that may be symmetric around the z-axis as shown in FIG. 26. The magnetic field generated by the transmit antenna 2614 may be concentrated near the two windings. In order to reduce the concentration of the magnetic field near the windings, portions of ferromagnetic material 2611*a-d* may be positioned above the windings, thereby providing a uniform magnetic field at the charging surface 1319. Each portion of the ferromagnetic material 2611*a-d* may have the same magnetic permeability. As described above, the ferromagnetic material 2611 may be shaped and positioned to provide a more uniform magnetic field at a charging surface 1319 of the transmitter 2600.

Figure 27:
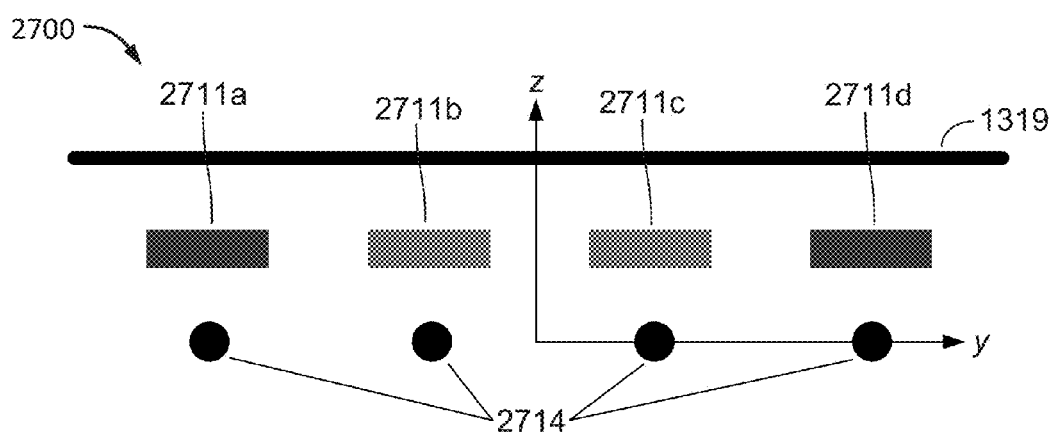
FIG. 27 shows a cross-section view of a wireless power transmitter that includes ferromagnetic material and a transmit antenna, according to another embodiment.

FIG. 27 shows a cross-section view of a wireless power transmitter 2700 comprising ferromagnetic material 2711 and a transmit antenna 2714. The transmit antenna 2714 may be substantially planar. The transmitter 2700 may also comprise a charging pad having a charging surface 1319 as described above. The ferromagnetic material may comprise four portions 2711*a-d*. The strength and direction of the magnetic field generated by the transmit antenna 2714 may be based on the positioning of the windings, as described above with reference to FIGS. 9 and 11. Accordingly, the ferromagnetic material 2711 may be shaped and positioned with respect to windings of the transmit antenna 2714 to provide a uniform magnetic field at the charging surface 1319. The transmit antenna 2714 may comprise two windings that may be symmetric around the z-axis as shown in FIG. 27. The magnetic field generated by the transmit antenna 2714 may be concentrated near the two windings. In order to reduce the concentration of the magnetic field near the windings, portions of ferromagnetic material 2711*a-d* may be positioned above the windings, thereby providing a uniform magnetic field at the charging surface 1319. The outer portions of ferromagnetic material 2711*a* and 2711*d* may have a magnetic permeability that is less than a magnetic permeability of the inner portions 2711*b* and 2711*c*. As described above, the ferromagnetic material 2711 may be shaped and positioned to provide a uniform magnetic field at a charging surface 1319 of the transmitter 2700. As described above, in some embodiments, each of the portions of ferromagnetic material 2711*a-d* may have a magnetic permeability that is different than a magnetic permeability of each of the other portions of ferromagnetic material 2711*a-d*. Furthermore, in some embodiments, each of the portions of ferromagnetic material 2711*a-d* having different permeability may be positioned at different heights or depths relative to the transmit antenna 2714 and the charging surface 1319.

FIGS. 28-31 show variations in the shape of the ferromagnetic material that may be used in a wireless power transmitter, as described above. Any of the variations in FIGS. 28-31, or a subset of the variation, may be implemented in the embodiments of FIGS. 14-27, alone or in combination.

Figure 28:
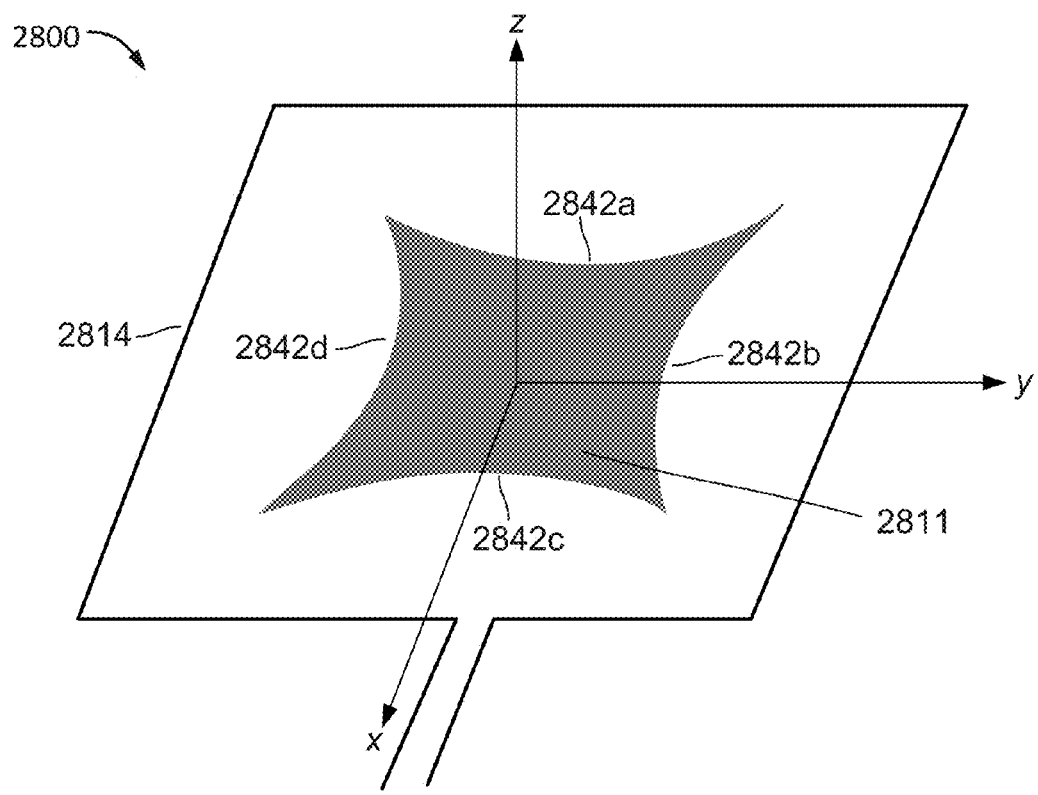
FIG. 28 shows a wireless power transmitter that includes ferromagnetic material having at least one curvature.

FIG. 28 shows a wireless power transmitter 2800 comprising a transmit antenna 2814 and ferromagnetic material 2811 having at least one curvature 2842 and positioned to modify a magnetic field generated by the transmit antenna 2814. The transmit antenna 2814 may be substantially planar. The transmitter 2900 may be configured similar to the transmitter 404 as described above with reference to FIG. 4. The ferromagnetic material 2811 may be positioned below the transmit antenna and may act as a conduit for the magnetic field, as described above with reference to FIG. 7. The ferromagnetic material 2811 may be shaped to have four concave curvatures 2842a-d in the x-y plane. In other embodiments, the ferromagnetic material 2811 may have convex curvatures in the x-y plane. In other embodiments, the ferromagnetic material 2811 may have at least one curvature with respect to the z-axis. As described above, the shape of the ferromagnetic material 2811 may be selected in order to provide a uniform magnetic field at a charging surface (not shown) of the transmitter 2800 based on the strength and direction of a magnetic field generated by the transmit antenna 2814.

Figure 29:
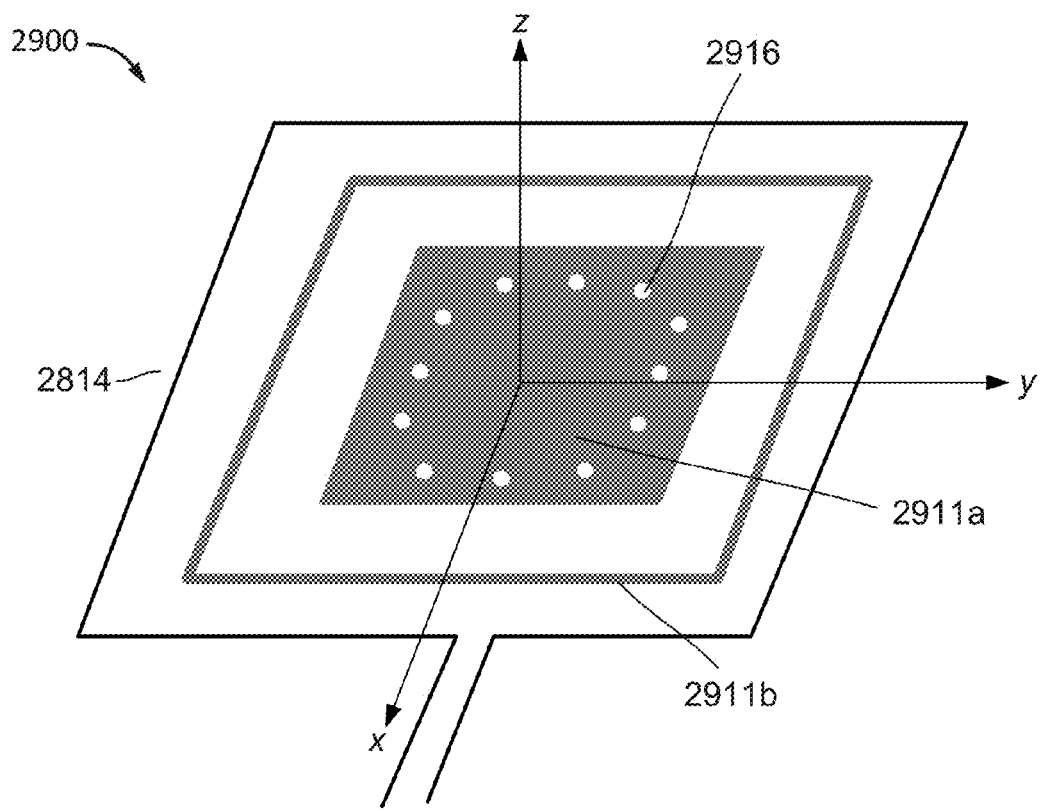
FIG. 29 shows a wireless power transmitter that includes an outer ring of ferromagnetic material surrounding a centrally located ferromagnetic material which includes a plurality of openings.

FIG. 29 shows a wireless power transmitter 2900 comprising the transmit antenna 2814 and an outer ring of ferromagnetic material 2911b surrounding a centrally located ferromagnetic material 2911a which includes a plurality of openings or apertures 1916. The two pieces of ferromagnetic material 2911a-b may be shaped and positioned to modify a magnetic field generated by the transmit antenna 2814. As shown in FIG. 29, the ferromagnetic material 2911a may comprise a plurality apertures or openings 2916. The apertures or openings 2916 may be positioned to allow at least some of the magnetic field to pass through the ferromagnetic material 2911a.

Figure 30:
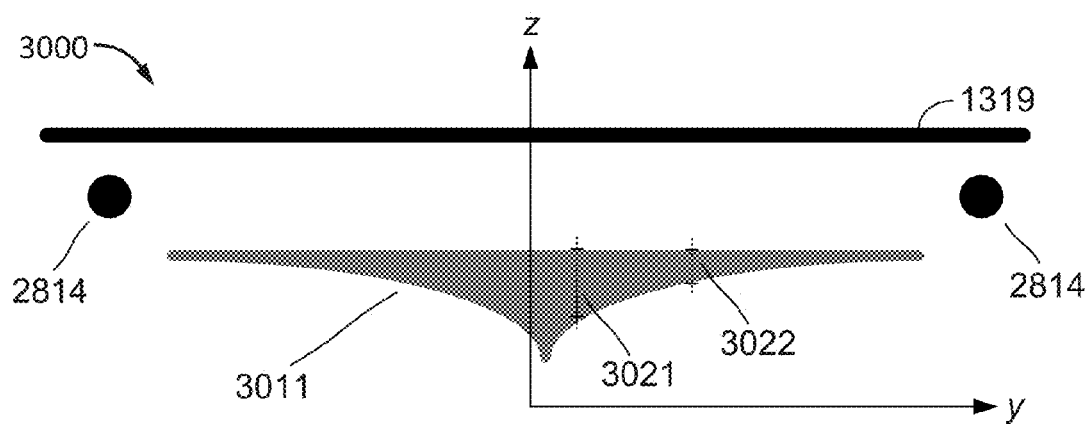
FIG. 30 shows a cross-section view of a wireless power transmitter that includes ferromagnetic material having variations in thickness.

FIG. 30 shows a cross-section view of a wireless power transmitter 3000 that includes ferromagnetic material 3011 having variations in thickness. The wireless power transmitter 3000 may comprise the transmit antenna 2814. As described above, the ferromagnetic material 3011 may act as a conduit for a magnetic field generated by the transmit antenna 2814. The ferromagnetic material 3011 may have a thickness (along the z-axis) that is greater in one portion (e.g., along line 3021) of the ferromagnetic material 3011 as compared to the thickness in a second portion (e.g., along line 3022) of the ferromagnetic material 3011. Variations in the thickness of the ferromagnetic material may cause a corresponding variation in the strength of a magnetic field generated by the transmit antenna 3014. For example, a thicker portion of the ferromagnetic material 3011 (e.g., along line 3021) may correspond to a greater magnetic field strength compared to thinner portions of the ferromagnetic material 3011 (e.g., along line 3022).

Figure 31:
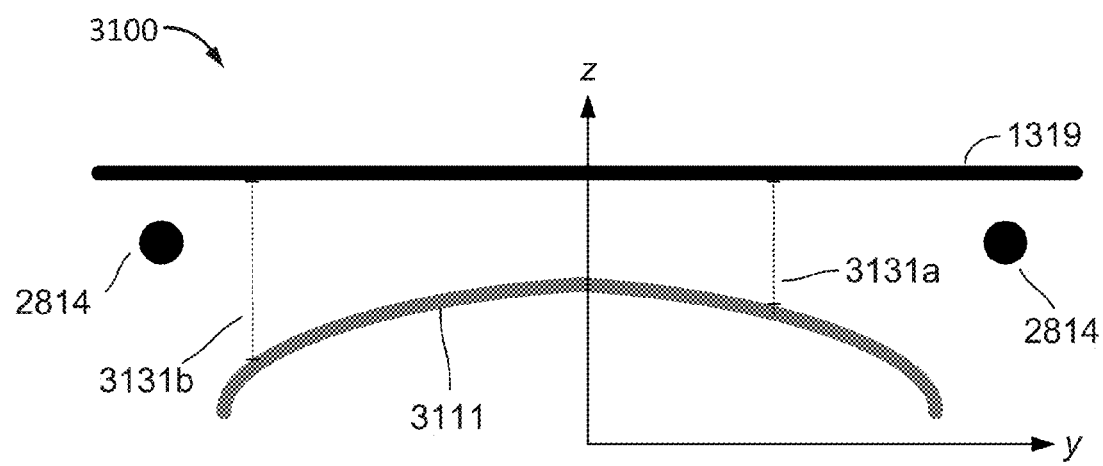
FIG. 31 shows a cross-section view of a wireless power transmitter that includes ferromagnetic material providing an air gap.

FIG. 31 shows a cross-section view of a wireless power transmitter 3100 that includes ferromagnetic material 3111 providing an air gap. The transmitter 3100 may comprise the transmit antenna 2814. The ferromagnetic material 3131 may have a curvature (along the z-axis) and provide an air gap 3131. As shown in FIG. 31, the air gap 3131 may have varying in the z-axis based on the curvature of the ferromagnetic material 3111. For example, the air gap 3131 may be thinner along line 3131a as compared to along line 3131b. The air gap 3131 may modify a magnetic field generated by the transmit antenna 3114 and may provide a uniform distribution of magnetic field in combination with the ferromagnetic material 3111. In addition, non-ferromagnetic material may be shaped and positioned to provide a gap that affects the magnetic field similarly to an air-gap.

The variations in the ferromagnetic materials described above with reference to FIGS. 14-31 may allow for the height of a wireless power transmitter pad to be reduced. In addition, the variations in ferromagnetic material may provide more uniform magnetic field strength for different shapes of transmit antennas. The variations in magnetic permeability of the portions of the ferromagnetic material may also provide control of magnetic field strength and distribution.

Figure 32:
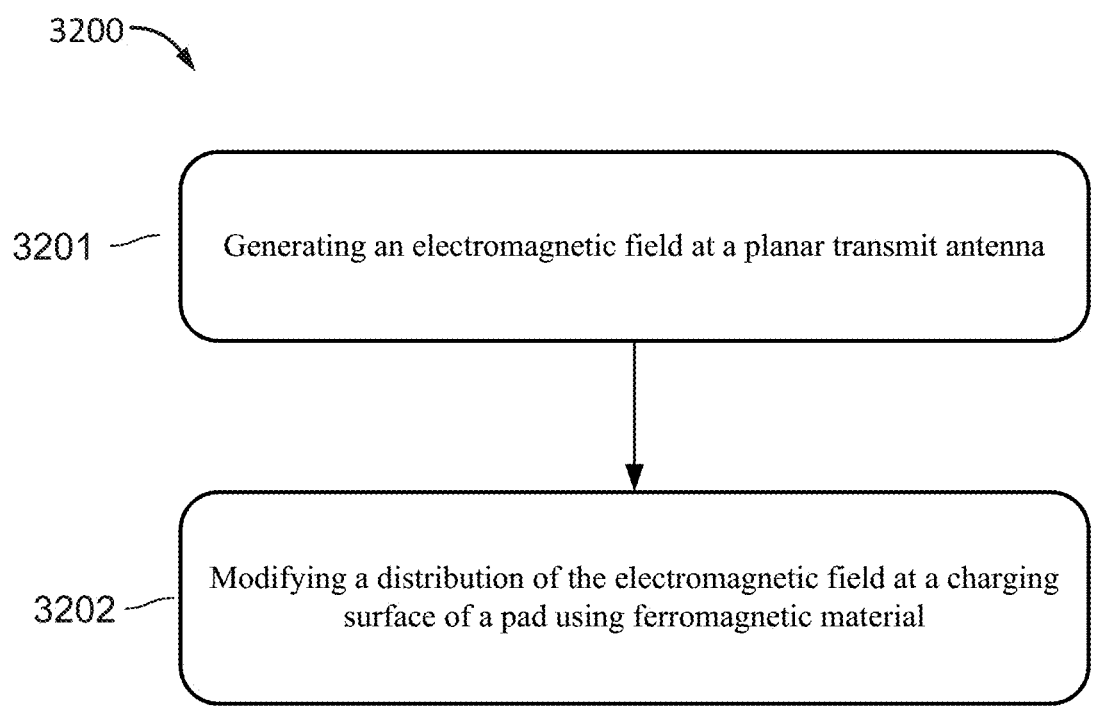
FIG. 32 is a flowchart of an exemplary method for wireless power transfer.

FIG. 32 is a flowchart 3200 of an exemplary method for wireless power transfer. At block 3201 the method may generate a magnetic field at a planar transmit antenna. At block 3202 the method may modify a distribution of the magnetic field at a charging surface of a pad using ferromagnetic material. In addition to improving magnetic field uniformity as described above, the shape, position, and magnetic permeability of ferromagnetic material may be selected in order to provide a non-uniform magnetic field with specific gradients.

A device for wireless power transfer may include means for generating a magnetic field. The magnetic field generating means may comprise any of the transmit antenna or coil configurations discussed above with respect to FIGS. 6-11 and 13-31. The magnetic field generating means may also comprise a planar antenna that combines some of the features of the transmit antennas of FIGS. 6-11 and 13-31. At least a portion of the magnetic field generating means may be disposed in a pad. The device for wireless power transfer may also include means for modifying a distribution of the magnetic field at a charging surface of the pad. The magnetic field distribution modifying means may have a shape and be positioned relative to the magnetic field generating means. The magnetic field distribution modifying means may comprise ferromagnetic material as discussed above with respect to FIGS. 6-11 and 13-31. The magnetic field distribution modifying means may also comprise ferromagnetic material that combines features of the transmit antennas of FIGS. 6-11 and 13-31.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for wireless power transfer, comprising:
a substantially planar transmit antenna configured to generate a magnetic field;
a pad having a charging surface, at least a portion of the transmit antenna being disposed in the pad; and
a ferromagnetic material having a shape and a position relative to the transmit antenna, at least one of the shape or position of the ferromagnetic material, or combination thereof, selected to modify a distribution of the magnetic field at the charging surface.

2. The device of claim 1, wherein a magnetic permeability of the ferromagnetic material is selected to modify the distribution of the magnetic field at the charging surface.

3. The device of claim 1, wherein the at least one of the shape or position of the ferromagnetic material, or combination thereof, is selected to increase a uniformity of the distribution of the magnetic field at the charging surface.

4. The device of claim 1, wherein at least one of the shape or position of the ferromagnetic material, or combination thereof, is selected to decrease a difference between maximum and minimum magnetic field strength values at the charging surface to modify the distribution of the magnetic field at the charging surface.

5. The device of claim 1, wherein at least a portion of the transmit antenna is positioned on a plane between the ferromagnetic material and the charging surface and wherein the ferromagnetic material is configured to reduce a strength of the magnetic field in a direction opposite the charging surface.

6. The device of claim 1, wherein at least a portion of the ferromagnetic material is positioned on a plane between the transmit antenna and the charging surface.

7. The device of claim 1, wherein the ferromagnetic material comprises a first ferromagnetic portion positioned on a first plane between the transmit antenna and the charging surface and a second ferromagnetic portion is positioned on a second plane below the transmit antenna and the charging surface, the transmit antenna being positioned on a third plane between the first ferromagnetic portion and the second ferromagnetic portion.

8. The device of claim 1, wherein the ferromagnetic material comprises a first ferromagnetic portion having a first magnetic permeability and a second ferromagnetic portion having a second magnetic permeability, the first magnetic permeability being different from the second magnetic permeability.

9. The device of claim 1, wherein the transmit antenna comprises a plurality of turns and wherein the ferromagnetic material is positioned between the plurality of turns.

10. The device of claim 1, wherein the ferromagnetic material comprises one or more apertures.

11. The device of claim 1, wherein a thickness of the ferromagnetic material is non-uniform.

12. The device of claim 1, wherein the shape of the ferromagnetic material has at least one curvature.

13. The device of claim 1, wherein the ferromagnetic material is spaced from the charging surface so as to provide a gap there between.

14. A method for wireless power transfer, comprising:
generating a magnetic field at a substantially planar transmit antenna, at least a portion of the transmit antenna disposed in a pad; and
modifying a distribution of the magnetic field at a charging surface of the pad using ferromagnetic material having a shape and positioned relative to the transmit antenna.

15. The method of claim 14, wherein modifying a distribution of the magnetic field at the charging surface comprises selecting a magnetic permeability of the ferromagnetic material.

16. The method of claim 14, wherein modifying the distribution of the magnetic field comprises increasing a uniformity of the distribution of the magnetic field at the charging surface.

17. The method of claim 14, wherein at least one of the shape or position of the ferromagnetic material, or combination thereof, is selected to decrease a difference between maximum and minimum magnetic field strength values at the charging surface to modify the distribution of the magnetic field at the charging surface.

18. The method of claim 14, wherein at least a portion of the transmit antenna is positioned between the ferromagnetic material and the charging surface.

19. The method of claim 14, wherein at least a portion of the ferromagnetic material is positioned between the transmit antenna and the charging surface.

20. The method of claim 14, wherein the ferromagnetic material comprises a first ferromagnetic portion having a first magnetic permeability and a second ferromagnetic portion having a second magnetic permeability, the first magnetic permeability being different from the second magnetic permeability.

21. The method of claim 14, wherein the transmit antenna comprises a plurality of turns and wherein the ferromagnetic material is positioned between the plurality of turns.

22. A device for wireless power transfer, comprising:
   means for generating a magnetic field, at least a portion of the magnetic field generating means disposed in a pad; and
   means for modifying a distribution of the magnetic field at a charging surface of the pad, the magnetic field distribution modifying means having a shape and positioned relative to the magnetic field generating means.

23. The device of claim 22, wherein the modifying means is configured to increase a uniformity of the distribution of the magnetic field at the charging surface.

24. The device of claim 22, wherein the generating means comprises a planar transmit antenna and the modifying means comprises ferromagnetic material.

25. An apparatus for wirelessly transferring charging power to one or more receiver devices, the apparatus comprising:
   a coil configured to generate a magnetic field for wirelessly transferring the charging power to the one or more receiver devices, the coil having a shape defining a first plane;
   a housing configured to house the coil, the housing having a surface configured to allow positioning the one or more receiver devices thereon, the surface defining a second plane substantially parallel to the first plane of the coil; and
   a ferromagnetic material positioned between the coil and the surface.

26. The apparatus of claim 25, wherein the ferromagnetic material is configured to increase a uniformity of the magnetic field across the surface where the one or more receiver devices receive power via the magnetic field.

27. The apparatus of claim 25, wherein at least one of a shape or position of the ferromagnetic material, or combination thereof, is selected to decrease a difference between maximum and minimum magnetic field strength values at the surface.

28. The apparatus of claim 25, wherein the ferromagnetic material comprises a first ferromagnetic portion positioned between the coil and the surface and a second ferromagnetic portion positioned below the coil.

29. The apparatus of claim 25, wherein the ferromagnetic material comprises a first ferromagnetic portion having a first magnetic permeability and a second ferromagnetic portion having a second magnetic permeability, the first magnetic permeability being different from the second magnetic permeability.

30. The apparatus of claim 25, wherein the ferromagnetic material comprises a first ferromagnetic portion and a second ferromagnetic portion, the first ferromagnetic portion and the second ferromagnetic portions positioned at different heights relative to the coil and each other.

* * * * *